(12) United States Patent
Fineberg et al.

(10) Patent No.: US 9,749,583 B1
(45) Date of Patent: Aug. 29, 2017

(54) LOCATION BASED DEVICE GROUPING WITH VOICE CONTROL

(71) Applicant: Amazon Technologies, Inc., Seattle, WA (US)

(72) Inventors: Adam Barry Fineberg, Saratoga, CA (US); Robert Franklin Ebert, Mountain View, CA (US); Tarun Yohann Morton, Sunnyvale, CA (US); Eric Peter Raeber, Redwood City, CA (US); Miroslav Ristic, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/087,784

(22) Filed: Mar. 31, 2016

(51) Int. Cl.
| | |
|---|---|
| *H04N 7/14* | (2006.01) |
| *H04L 29/08* | (2006.01) |
| *H04W 4/02* | (2009.01) |
| *H04B 17/318* | (2015.01) |
| *G06K 9/00* | (2006.01) |
| *G10L 15/22* | (2006.01) |

(52) U.S. Cl.
CPC ......... *H04N 7/147* (2013.01); *G06K 9/00228* (2013.01); *G10L 15/22* (2013.01); *H04B 17/318* (2015.01); *H04L 67/306* (2013.01); *H04W 4/023* (2013.01); *G10L 2015/223* (2013.01)

(58) Field of Classification Search
CPC ............ H04N 7/14; H04N 7/15; H04N 7/152; H04N 21/485; H04N 7/147; H04N 7/148; H04N 21/4788; H04W 4/02; H04W 64/00; H04W 4/023; H04L 65/1069

USPC .......................................... 348/14.01–14.16
See application file for complete search history.

(56) References Cited

U.S. PATENT DOCUMENTS

| | | | |
|---|---|---|---|
| 5,924,070 A * | 7/1999 | Ittycheriah | ............ H04M 1/271 379/88.03 |
| 2007/0206566 A1* | 9/2007 | Bennett | ................... H04L 12/66 370/352 |
| 2013/0136089 A1 | 5/2013 | Gillett et al. | |
| 2014/0176797 A1 | 6/2014 | Silva et al. | |

(Continued)

OTHER PUBLICATIONS

Office action for U.S. Appl. No. 15/087,851, mailed on Nov. 22, 2016, Fineberg et al., "Sensor Fusion for Location Based Device Grouping", 13 pages.

*Primary Examiner* — Melur Ramakrishnaiah
(74) *Attorney, Agent, or Firm* — Lee & Hayes, PLLC

(57) ABSTRACT

This disclosure is directed to facilitating voice and video communication between users independent of a location or a device. A communication request can specify users, who may be identified and located in their respective environments. For example, users can be identified and located using facial recognition imaging techniques and/or by monitoring a radio frequency (RF) signal associated with a device that is carried or worn by a user. After determining a location of a user, individual devices can be configured as a functionally grouped device to allow the users to communicate. For example, capabilities of a television, microphone, speaker, and imaging device can be combined to allow a video communication between users. Further, as a user moves around his or her environment, the location of the user can be tracked and additional functionally grouped devices can be provided for seamless communication.

20 Claims, 12 Drawing Sheets

(56) References Cited

U.S. PATENT DOCUMENTS

| | | | |
|---|---|---|---|
| 2014/0211666 A1* | 7/2014 | Gillett | H04M 7/0087 |
| | | | 370/259 |
| 2014/0320585 A1 | 10/2014 | Igoe | |
| 2015/0121406 A1* | 4/2015 | Chai | H04H 60/45 |
| | | | 725/10 |
| 2015/0124042 A1* | 5/2015 | MacDonald | H04M 1/2535 |
| | | | 348/14.01 |
| 2016/0183037 A1 | 6/2016 | Grohman | |

* cited by examiner

LOCATION BASED DEVICE GROUPING WITH VOICE CONTROL

BACKGROUND

Homes are becoming more connected with the proliferation of computing devices such as desktops, tablets, entertainment systems, and portable communication devices. As these computing devices evolve, different ways have been introduced to allow users to interact with them, such as through mechanical devices (e.g., keyboards, mice, etc.), touch screens, motion, and gesture. Another way to interact with computing devices is through natural-language input such as speech input and gestures. Discussed herein are technological improvements for, among other things, these devices and systems.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
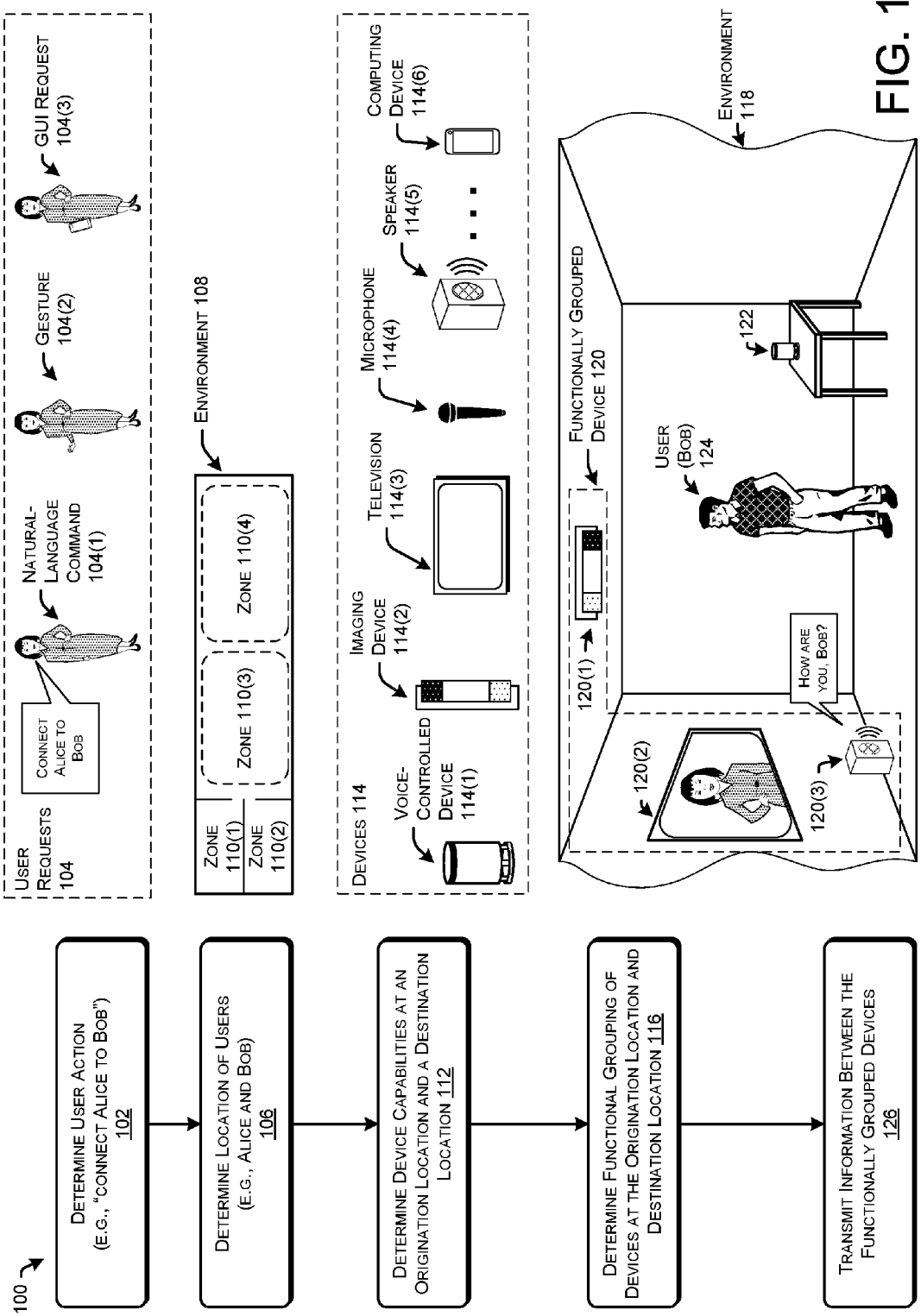
FIG. 1 shows a pictorial flow diagram of a process to facilitate a communication by determining locations of users and determining functional groupings of devices at the locations based on the capabilities of devices at the user locations.

This disclosure describes methods, apparatuses, and systems for facilitating communications between users by locating users in their respective environments and creating functionally grouped devices for voice or video communications. For example, users can be identified and located using facial recognition imaging techniques and/or by monitoring a radio frequency (RF) signal associated with a device that is carried or worn by a user. After determining a location of a user, individual devices can be configured as a functionally grouped device (also referred to as a "functionally grouped arrangement") to allow the users to communicate. For example, capabilities of a television, microphone, speaker, and imaging device can be combined to allow a video communication between users. Further, as a user moves around his or her environment, the location of the user can be tracked and additional functionally grouped devices can be provided for seamless communication.

For instance, an environment may include an array of devices that are configured to perform an array of operations. To illustrate, an environment may include devices such as televisions, set-top boxes, microphones, speakers, audio systems, imaging devices, computers, computing devices, smartphones, telephones, tablets, modems, routers, lights, dishwashers, washing machines, coffee machines, refrigerators, door locks, window blinds, thermostats, garage door openers, air-conditioning units, alarm systems, motion sensors, biometric sensors, pressure sensors, radio frequency sensors, ovens, microwaves, and the like. These devices may be capable of coupling to a network (e.g., a LAN, WAN, etc.) and/or may be capable of communicating with other devices via wireless radio communication (e.g., Wi-Fi, Bluetooth®, Zigbee®, Z-Wave®, LoRa®, etc.). As such, these devices may be utilized to locate a user within an environment, and/or may include functions and capabilities that can be grouped together to facilitate communications that may otherwise not be possible if the devices remained as standalone devices. These devices may be controllable by a user remotely, such as via a graphical user interface (GUI) on a mobile phone of the user, via voice commands of the user, or the like.

In some instances, the environment includes a device configured to receive voice commands from the user and to cause performance of the operations requested via these voice commands. Such a device, which may be known as a "voice-controlled device," may include one or more microphones for capturing audio signals that represent or are otherwise associated with sound from an environment, including voice commands of the user. The voice-controlled device may also be configured to perform automated speech recognition (ASR) on the audio signals, or may be configured to provide the audio signals to another device (e.g., a device of a network device) for performing the ASR on the audio signals. After the voice-controlled device or another device identifies a voice command of the user, the voice-controlled device or the other device may attempt to direct the requested operation to be performed.

In some instances, the voice-controlled device may be configured to initiate a communication between two users. For instance, a user may issue a voice command to the voice-controlled device to "Connect Alice to Bob" or to "Connect me to Bob." The voice-controlled device or another device may perform ASR on a captured audio signal to identify the command ("connect") along with the referenced users ("Alice" and "Bob"). Similarly, a communication may be initiated using a GUI of a computing device or using a gesture-based imaging system. Based on the user requests, a network device (e.g., a server computer remote from a user environment or located at the user environment) can locate the users "Alice" and "Bob," and can determine a functionally grouped device at the respective locations of the users by combining functions of individual devices to facilitate a voice or video call, for example. In some instances, a location of a user can be continuously tracked and stored in memory at a network device. In such a case, when a user request is received to initiate a communication, the location can be retrieved from memory and provided to determine a functionally grouped device at the respective location.

In some instances, a user can be located within a room or a zone associated with an environment, such as a home of the user. In some instances, a user environment may include imaging devices that can image the environment and perform facial recognition to determine that the user (e.g., "Alice" or "Bob") is in a particular room or zone of an environment. In some instances, it may not be possible to identify a user with certainty, and an environment may monitor other sensor data associated with a user to improve a certainty or confidence level of an identity and/or location of the user. For example, the user environment may include sensors to monitor a signal strength of a radio frequency (RF) signal associated with a user or associated with a computing device, such as a smartphone, or wearable device, such as a smartwatch, of a user. Based upon a received signal strength indicator (RSSI), RF localization or triangulation, or other techniques, the system can increase or decrease the confidence level of an identity and/or a location of the user. In some instances, various smart appliances (e.g., a lamp, a refrigerator, etc.) can monitor a RF signal associated with a user and transmit information relating to the signal strength to the network device for use in determining the identity and/or location of the user. Similarly, in environments with multiple voice-controlled devices (or multiple devices capturing audio), a location of a user can be determined by comparing the amplitude or strength of a received audio signal between the various devices.

In some instances, the location of a user is tracked and updated as the user moves from one location to another. The location of the user is stored in memory, and updated based in part on a location event, which may correspond to a change in location of the user. In some instances, when a communication is initiated between a first user and a second user, the first user may receive the location of the second user, and may receive updates of the location of the second user as the user moves about an environment.

After a location of a user is determined, a functionally grouped device may be configured based upon the requested capabilities for a communication, preferences of the user, available capabilities of devices present in the environment, and other factors. For example, if the user is attempting a video call, the communication requires a device to capture audio (e.g., via a microphone), a device to output audio (e.g., via a speaker), a device to capture video (e.g., via a camera or imaging device), and a device to output video (e.g., via a television, projector, or other display). In some instances, devices present at the location of the user (or within a threshold distance of the user) may provide some or all of the capabilities for conducting the communication. In some instances, there may be more devices than are needed, and in some instances, there may be devices with overlapping capabilities or devices that provide more than one capability. In some instances, individual devices can be selected for the functionally grouped device based on preferences of the users, technical compatibility (e.g., supported resolutions for video), quality of a connection (e.g., latency, voice clarity or volume, environment lighting for video, etc.), orientation within the environment (e.g., proximity to other devices), a direction that a user is facing (e.g., towards a particular television or display), whether the devices are currently in use, etc. After the individual devices are selected for the functionally grouped device, the capabilities of the functionally grouped devices can be connected, for example, between an origination location and a destination location.

As a user moves about an environment, additional functionally grouped devices can be configured and the communication can be passed to the additional functionally grouped devices to provide for seamless communication. Further, depending on the capabilities of the functionally grouped devices, a conversation may be upgraded or downgraded as the user moves about the environment. For example, the user may initiate a video call in a living room using a functionally grouped device consisting of a television, a microphone, and an imaging device. In this example, when the user moves to another room, such as an office or a bedroom, the conversation may be downgraded to a voice call based on the preferences of the user and/or based on the capabilities provided by the functionally grouped device in the new location. If the user returns to the living room, for example, the voice call may be upgraded to a video call and the conversation may be continued.

The methods, apparatuses, and systems described herein can be implemented in a number of ways. Example implementations are provided below with reference to the following figures.

FIG. 1 shows a pictorial flow diagram of a process 100 to facilitate a communication by determining locations of users and determining functional groupings of devices at the locations based on the capabilities of devices at the user locations.

At 102, the operation includes determining a user action. In some instances, the user action is determined from one or more user requests 104, such as a natural language command 104(1), a gesture 104(2), and a GUI request 104(3). A natural language command 104(1) may be user speech, such as a command to "Connect Alice to Bob," which may be received by a voice-controlled device. In some instances, the system may include a voice recognition component such that a user may speak a command such as "Connect me to Bob," such that the system can determine the identity of "me" in the natural-language command 104(1). In some instances, the operation 102 may include performing ASR on the natural-language command 104(1). Further, the user request 104 may include a gesture 104(2) performed by a user, such as a predetermined motion that indicates an action to be performed. In some instances, the gesture 104(2) may be received by an imaging device configured to receive gestures as an input. The user request 104 may include a GUI request 104(3), such that a user may input a request using a GUI of a computing device, for example. In some instances, the user request 104 may specify a communication between individuals, rather than specifying communication between devices associated with individuals.

In some instances, the user request 104 does not need to specify a location of the users, or whether the connection is to be a voice call or a video call. In some instances, the user request 104 may include additional information, such as to "Connect Alice to Bob as a video call" or "Connect Alice at home to Bob at Bob's office." In some instances, additional information included in the user requests 104 can be used in locating a user (e.g., by increasing or decreasing the confidence level of the location determination, to be discussed further below), and/or can be used in determining preferences of devices when configuring a functionally grouped device.

At 106, the operation may include determining the location of users associated with the user action determined in the operation 102. For example, the operation 106 may include determining a location of "Alice" or "Bob" in an environment 108. In some instances, the environment 108 may include one or more zones 110(1), 110(2), 110(3), and 110(4) (which may be referred to collectively as zones 110). In some instances, individual zones 110 may be defined by the physical layout of the environment, such as the individual rooms of a user's house. In some instances, the zones 110 may be defined by sensing devices at the environment 110. For example, zones 110(3) and 110(4) may be defined as areas monitored by individual imaging devices. In some instances, zones 110 may be overlapping or non-overlapping. In some instances, the operation 106 may be performed continuously and/or as a background process. That is to say, a location of a user can be monitored and stored in memory, such that a current location of a user is known (or a last known location of a user is known). User movement may generate a location event, which corresponds to a change in location from a user. A location of a user may be determined using one or more sensing device (e.g., imaging devices, RF devices, etc.).

At 112, the operation may include determining device capabilities at an origination location and/or at a destination location. For example, if a user "Alice" issues a natural-language command 104(1) to "Connect Alice to Bob," the origination location may refer to a location of Alice, and a destination location may refer to a location of Bob. The devices 114 may include, but are not limited to, devices such as a voice-controlled device 114(1), an imaging device 114(2), a television 114(3), a microphone 114(4), a speaker 114(5), and a computing device 114(6). The operation 112 can include determining the capabilities of the devices 114 present at the respective origination location and destination location, such as whether a device 114 can capture audio, output audio, capture video, or output video, as well as the technical specifications associated with each high-level feature. For example, with respect to the television 114(3), the operation 112 may include determining a resolution, frame rate, refresh rate, color gamut, etc. of the television 114(3). As another example, with respect to the voice-controlled device 114(1), the operation 112 may include determining an audio response of a speaker associated with the device 114(1) and a file format, bit rate, or a set of codecs associated with audio captured by the microphone of the voice-controlled device 114(1). With respect to the microphone 114(4), for example, the microphone 114(4) may be embodied as a remote control, or as a standalone device.

In some instances, the operation 112 may include determining the requested capabilities for a communication requested by the user action 102. For example, in a case where a video call is requested by the user request 104, the operation 112 may include determining that devices to capture audio and video, and devices to output audio and video, are required at both the origination location and the destination location.

At 116, the operation may include determining a functional grouping of devices at the origination location and/or at the destination location. For example, an environment 118 may correspond to the environment 108, and may include one or more zones 110. As illustrated in the environment 118, the environment 118 includes a functionally grouped device 120 consisting of an imaging device 120(1), a television 120(2), and a speaker 120(3). For example, the imaging device 120(1) may capture video and audio, the television 120(2) may output video, and the speaker 120(3) may output audio. Thus, in this example, the functionally grouped device 120 may be capable of providing a video call between the origination location and the destination location (when both locations include devices having similar capabilities). Further, although the environment 118 includes a voice-controlled device 122, in this example, the functionally grouped device 120 does not utilize the capabilities of the voice-controlled device 122, for example, because a user 124 in the environment 118 is facing away from voice-controlled device 122, for example. That is to say, in some instances, a functionally grouped device can be determined based on a quality of audio and/or video captured, or based on a quality of audio and/or video to be output.

At 126, the operation includes transmitting information between the functionally grouped devices. For example, the operation 126 may include negotiations between individual devices of the functionally grouped device 120 and a corresponding functionally grouped device at the origination location associated with "Alice." For instance, the negotiations may include determining a bit rate, codec, file format, etc., involved in setting up and transmitting a stream of information between devices. For example, each stream may be unidirectional and may be negotiated independently of the other streams, while in some instances, streams may be coupled and data may be sent together (e.g., audio and video).

Figure 2:
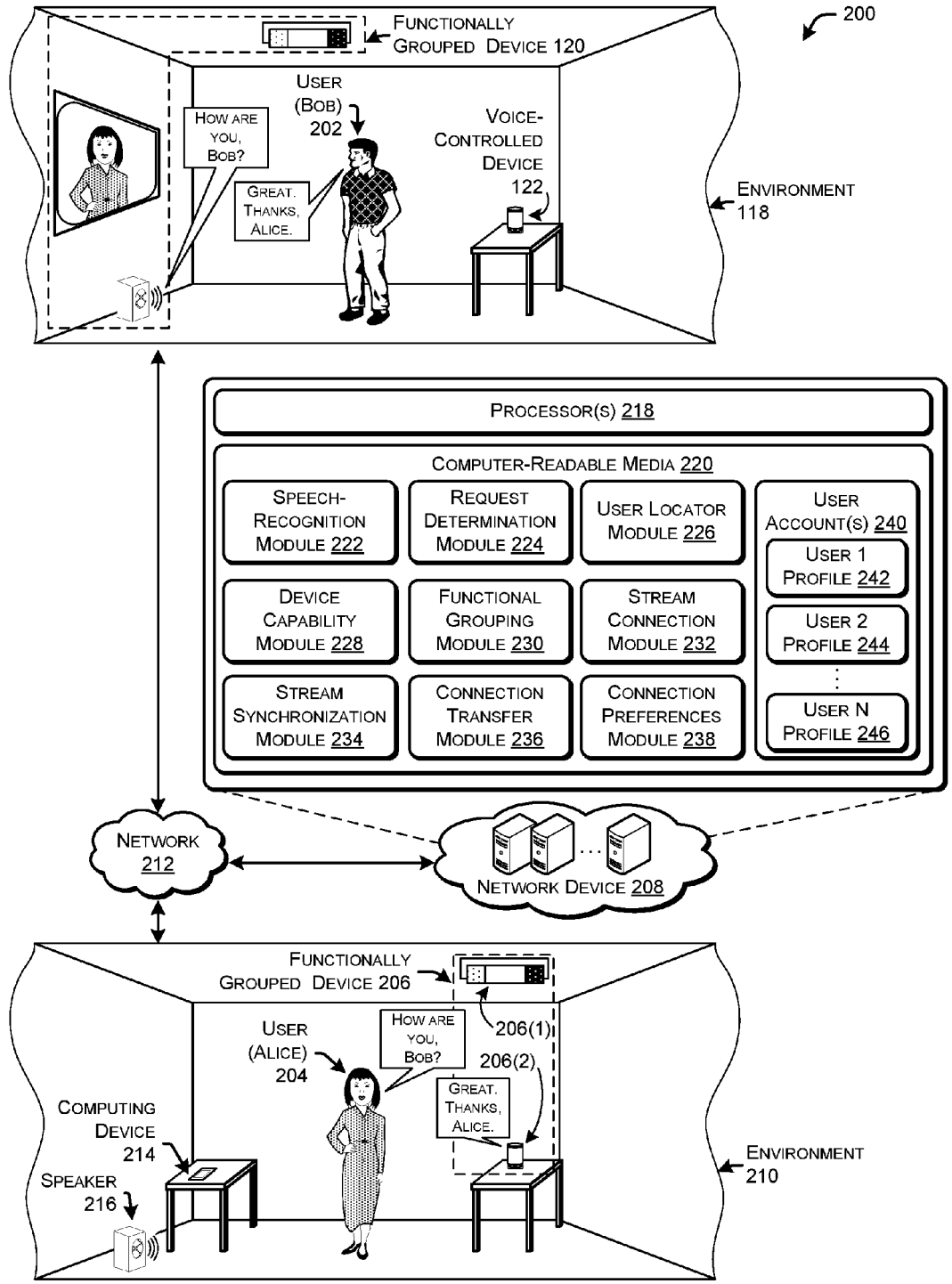
FIG. 2 is a schematic diagram of an illustrative architecture in which users communicate via functionally grouped devices.

FIG. 2 is a schematic diagram of an illustrative architecture 200 in which users 202 and 204 communicate via functionally grouped devices 120 and 206. Further, the architecture 200 includes a network device 208 coupled to the environments 118 and 210 via the network 212. The environment 118 is discussed above with respect to FIG. 1. The environment 210 is a location associated with the user 204 ("Alice"), and the functionally grouped device 206 includes an imaging device 206(1) capturing video and a voice-controlled device 206(2) capturing audio and outputting audio. As shown in the environments 118 and 210, that the user 202 "Bob" is viewing the user 204 "Alice" via a display screen, while the user 204 "Alice" is communicating only via voice, illustrates that the functionally grouped devices 120 and 206 may provide different capabilities corresponding to different communication types. In some instances, the environment 210 further includes a computing device 214 and a speaker 216. In some instances, the computing device 214 may be capable of generating and outputting both audio and video. However, as discussed herein, in some instances the user 204 may prefer to communicate via the functionally grouped device 206, for example, instead of communicating via the computing device 214.

In some instances, the various types of communication between the user 202 and the user 204 may include, but are not limited to, video, audio, text, multi-media and/or any other way of providing data representing human-understandable information. For example, in a case where the user 202 is at home and initiates a voice communication with the user 204 while the user 204 is operating a vehicle, the communication may include converting the conversation from one type of communication to another. For example, audio from the user 202 can be received at a voice-controlled device 114(1), converted to text and sent as a text message (e.g., an SMS or MMS) to the user 204. As the text message is received by the user 204, the text message may optionally be converted into speech that is presented to the user 204 at the vehicle of the user 204.

In some instances, the network device 208 may communicatively couple to the network 212 via wired technologies (e.g., wires, USB, fiber optic cable, etc.), wireless technologies (e.g., Wi-Fi, RF, cellular, satellite, Bluetooth®, etc.), or other connection technologies. The network 212 is representative of any type of communication network, including data and/or voice network, and can be implemented using wired infrastructure (e.g., cable, CAT5, fiber optic cable, etc.), a wireless infrastructure (e.g., Wi-Fi, RF, cellular, microwave, satellite, Bluetooth®, etc.), and/or other connection technologies.

The network device 208 may generally refer to a network-accessible platform—or "cloud-based service"—implemented as a computing infrastructure of processors, storage, software, data access, and so forth that is maintained and accessible via the network 212, such as the Internet. Cloud-based services may not require end-user knowledge of the physical location and configuration of the system that delivers the services. Common expressions associated with cloud-based services, such as the network device 208, include "on-demand computing," "software as a service (SaaS)," "platform computing," "network accessible platform," and so forth. In some instances, cloud-based services may be provided via a remote network device. In some instances, some or all of the functionality of the network device 208 may be provided by a computing device located within the environments 118 and 210, and in some instances, a network device located in a user environment may be referred to as a local network device. For example, and without limitation, a user locator module 226 (discussed below) may be provided for the user 202 and the user 204 by a computing device at the environments 118 and 210, respectively. That is to say, a user may maintain a computing device at their home, for example, to function as a "hub" to coordinate activity and communication between the voice-controlled device, the network device, the individual devices in an environment, and the functionally grouped devices, as discussed herein. For example, a location of a user may be determined by a computing device associated with each user apart from a "cloud-based service," to maintain privacy for each user.

As illustrated, the network device 208 comprise one or more processors 218 and computer-readable storage media 220 executable on the processors 218. The computer-readable media 220 may store one or more modules including a speech-recognition module 222, a request determination module 224, a user locator module 226, a device capability module 228, a functional grouping module 230, a stream connection module 232, a stream synchronization module 234, a connection transfer module 236, a connection preferences module 238, one or more user account(s) 240, and user profiles 242, 244, and 246. Upon the device 206(2) identifying the user 204 speaking a predefined wake word (in some instances), the device 206(2) may begin uploading an audio signal representing sound captured in the environment 210 up to the network device 208 over the network 212.

In response to receiving this audio signal, the speech-recognition module 222 may begin performing automated speech recognition (ASR) and/or natural language understanding on the audio signal to generate text and identify one or more user voice commands from the generated text. For instance, as described above in FIG. 1, a user request may include the speech "Connect Alice to Bob." As the audio signal representing this sound is uploaded to the speech-recognition module 222, the module 222 may identify the user requesting to initiate a communication between "Alice" and "Bob." In some instances, the speech-recognition module 222 may include a voice recognition module that may determine an identity of a user based upon analyzing the audio signal including the speech of that user. Thus, in an example where the natural-language command includes "Connect me to Bob," the speech-recognition module 222 may determine that "me" corresponds to "Alice."

As the speech is recognized by the speech-recognition module 222, the text of the speech may be passed to the request determination module 224 to determine the command indicated by the speech. For example, the request determination module 224 may include a contact list associated with a user profile of the requester (i.e., "Alice"), and may determine that "Bob" corresponds to an individual in the contact list associated with the user profile. In some instances, a request may be received as a gesture (e.g., gesture 104(2)) or as a GUI request (e.g., GUI request 104(3)), in which case the request determination module 224 may interpret the request as it comes. In some instances, if the identity of one or more users is unknown, or where there may be more than one possible user, the voice-controlled device 206(2) may follow up with additional questions to the user 204 to ascertain the identities of the users.

In some instances, the network device 208 may include one or more user account(s) 240 including one or more user profiles, such as the user 1 profile 242, the user 2 profile 244, . . . , and the user N profile 246. In some instances, the user account 240 may include household specific information including but not limited to, one or more shipping addresses, billing addresses, devices available for grouping, etc. In some instances, each user of a household may have their own associated user profile. For example, the user 1 profile 242 may include personalized information including but not limited to, preferred content, preferred devices, preferred connections, shopping history, biometric data (e.g., computer vision based facial recognition, fingerprint recognition, voice recognition), radio frequency data (e.g., a user's mobile telephone number, a user's mobile phone Bluetooth identification or Wi-Fi identification, a wireless identification associated with a wearable device (e.g., a smartwatch) of a user, etc.), and access restrictions (parental controls/adult content filters, etc.). As illustrated in FIG. 2, multiple profiles 242, 244, and 246 can be associated with the user account 240.

After the identities of the individuals are determined by the request determination module 224, the user locator module 226 may determine a location of each user using a number of available resources. For example, the user locator module 226 may determine a location of a user with varying granularity and an associated confidence level. For example, the user locator module 226 may know generally that a user is at home because the user is utilizing a Wi-Fi connection at their home. However, as more information is collected and analyzed, the accuracy and confidence level of the location determination may increase. In some instances, operations of the user locator module 226 are performed continuously in an environment, independent of any request to initiate a communication. For example, a location of a user may be determined, stored in memory, and updated as the user moves about the environment. In such a case, when a communication is initiated by a first user, the location of the second user stored in memory can be provided to the first user, and the location of the second location can be updated and provided to the first user as the second user moves about the environment. Aspects of the user locator module 226 are discussed below in connection with FIG. 3.

In some instances, the device capability module 228 may monitor, determine, and/or manage the capabilities of devices within individual environments 118 and 210. For example the device capability module 228 may include a database indicating whether individual devices can capture audio, output audio, capture video, and/or output video. Further, the device capability module 228 may monitor technical specification such as bit rates, codecs, resolutions, etc., and can monitor whether a device is in use, online, or offline. Further, the device capability module 228 may include an interface allowing users to configure devices within their environment. Aspects of the device capability module 228 are discussed below in connection with FIGS. 4A, 4B, and 5.

In some instances, the functional grouping module 230 may configure individual devices in a user environment to function as a functionally grouped device to facilitate communication between users. Aspects of the functional grouping module 230 are discussed below in connection with FIG. 6.

In some instances, the stream connection module 232 may configure connections between individual devices comprising a functionally grouped device. Aspects of the stream connection module 232 are discussed below in connection with FIG. 7.

In some instances, the stream synchronization module 234 may be configured to synchronize streams within a functionally grouped device to reduce echo or to synchronize audio and video, for example. In some instances, the stream synchronization module 234 synchronizes reference clocks within each device to perform echo cancellation, for example, to prevent the audio output by an individual device from being captured as audio by an individual device to be transmitted in the conversation. In some instances, the stream synchronization module 234 can synchronize the audio and video streams to correct for any lag or delays in presenting the communications.

In some instances, the connection transfer module 236 transfers a connection between various functionally grouped devices as a user moves about an environment. For example, the connection transfer module 236 may determine when a user has left a location associated with a functionally grouped device and can establish streams with a new functionally grouped device more closely associated with an updated location of the user. The connection transfer module 236 can upgrade or downgrade a connection based upon device capabilities and/or user preferences or rules to provide seamless communications. In some instances, as a user moves from a first location in a first environment to a second location in the environment, the connection transfer module 236 can blend voice and/or video data transmitted and presented at a second environment associated with another user. For example, a sound output at the second environment may include contributions from a first audio stream from the first location in the first environment and from a second audio stream from the second location in the first environment. With respect to video, the connection transfer module 236 may cause video from the first and second location to be presented simultaneously (e.g., as a split screen showing multiple video streams) at the second environment so that a continuity of connection may be maintained.

In some instances, the connection preferences module 238 may determine and/or apply user rules and/or preferences for communications described herein. For example, a user may set user preferences for communications via a voice command and/or via a GUI. For instance, the connection preferences module 238 may determine which individual devices are to be used in a functionally grouped device based on a number of factors such as, but not limited to, a time of day, day of the week, time of the year, an identity of the person called, a location where a communication is initiated, a location to where a user has moved, whether an individual device is in use, a level of background noise, a level of background light, capabilities of available devices, capabilities of devices, quality of a stream captured or output by a particular device, locations of devices within a zone or room, distances between devices, etc. In some instances, the connection preferences module 238 may be associated with a particular user via a user profile. For example, a command to "Connect Alice to Bob" may result in a communication different from a command to "Connect Carol to Bob." Further, the connection preferences module 238 may facilitate a formation of a functionally connected device based on a confidence level of a user at a particular location, for example.

Figure 3:
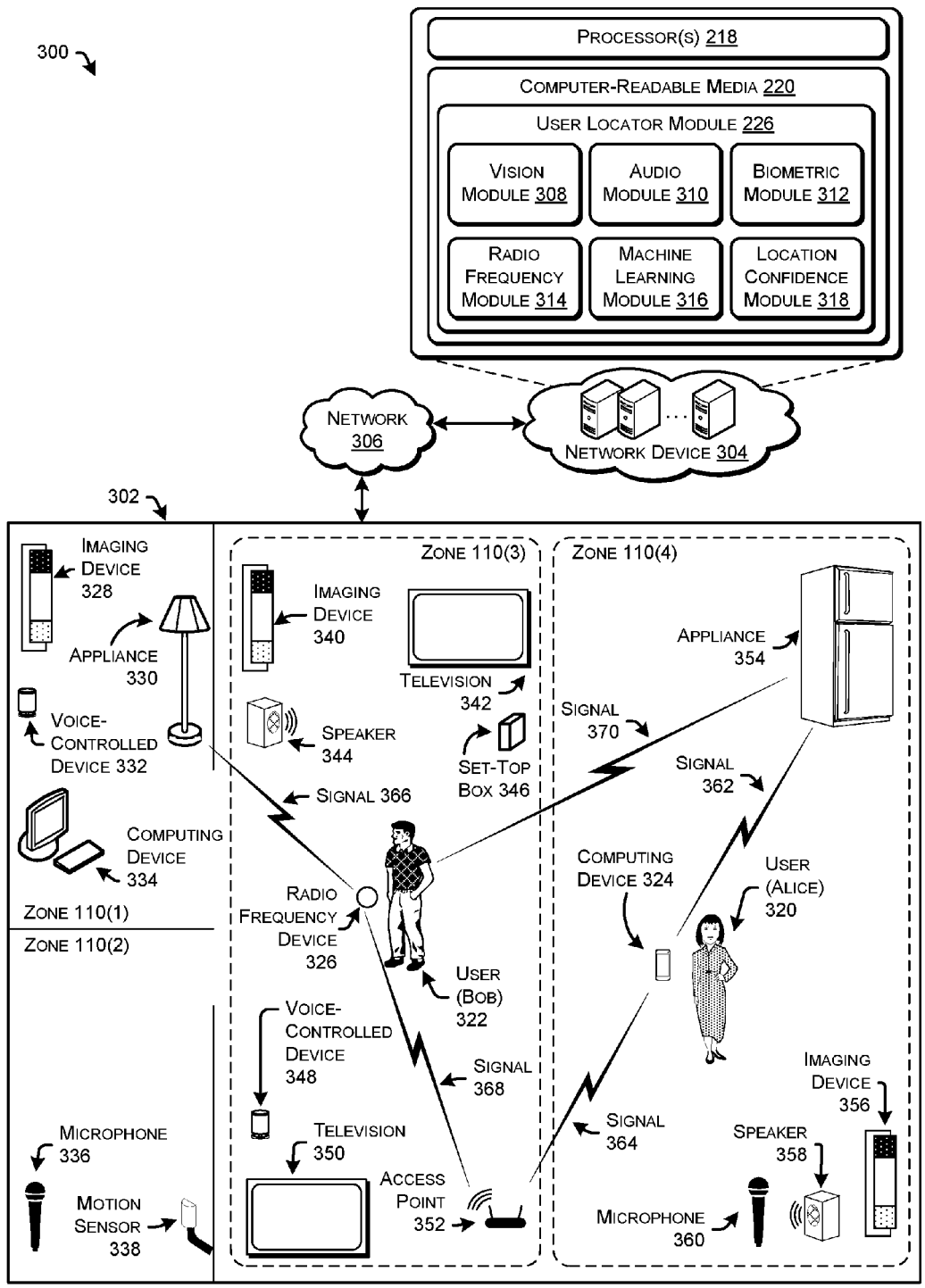
FIG. 3 is a schematic diagram of an illustrative architecture in which sensor data is combined to determine locations of users to communicate via functionally grouped devices.

FIG. 3 is a schematic diagram of an illustrative architecture 300 in which sensor data is combined to determine locations of users to communicate via functionally grouped devices. The architecture 300 includes an environment 302 coupled to a network device 304 via a network 306. In some instances, the network device 304 and network 306 may correspond to the network device 208 and network 212 of FIG. 2.

As illustrated, the user locator module 226 may include one or more modules including a vision module 308, an audio module 310, a biometric module 312, a radio frequency module 314, a machine learning module 316, and a location confidence module 318. In some instances, the user locator module 226 may monitor data and determinations from one or more modules to determine an identity of a user and/or a location of a user in the environment 302. The details of the vision module 308, the audio module 310, the biometric module 312, the radio frequency module 314, the machine learning module 316, and the location confidence module 318 are provided below following a description of the environment 302.

In some instances, the environment 302 may represent a home or office associated with a user 320 "Alice" and/or a user 322 "Bob." In some instances, the user 320 "Alice" may be associated with a computing device 324, such as a smartphone. In some instances, the user 322 "Bob" may be associated with a radio frequency device 326, such as a wearable device (e.g., a smartwatch) or an identifier beacon.

The environment 302 may include, but is not limited to, a number of devices that may be used to locate a user and/or devices that may be used in forming a functionally grouped device. For example, within zone 110(1), the environment 302 may include an imaging device 328, an appliance 330, a voice-controlled device 332, and a computing device 334. Within zone 110(2), the environment 302 may include a microphone 336 and a motion sensor 338. Within zone 110(3), the environment may include an imaging device 340, a television 342, a speaker 344, a set-top box 346, a voice-controlled device 348, a television 350, and an access point 352. Within zone 110(4), the environment 302 may include an appliance 354, an imaging device 356, a speaker 358, and a microphone 360.

Figure 4A:
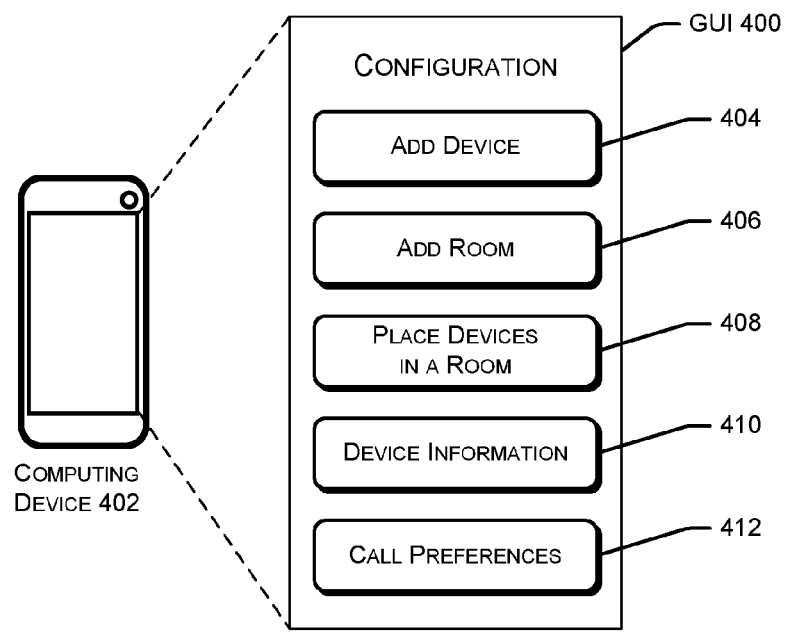
FIG. 4A shows an example graphical user interface (GUI) that a user may utilize to configure devices in an environment to be functionally grouped for communication.
Figure 4B:
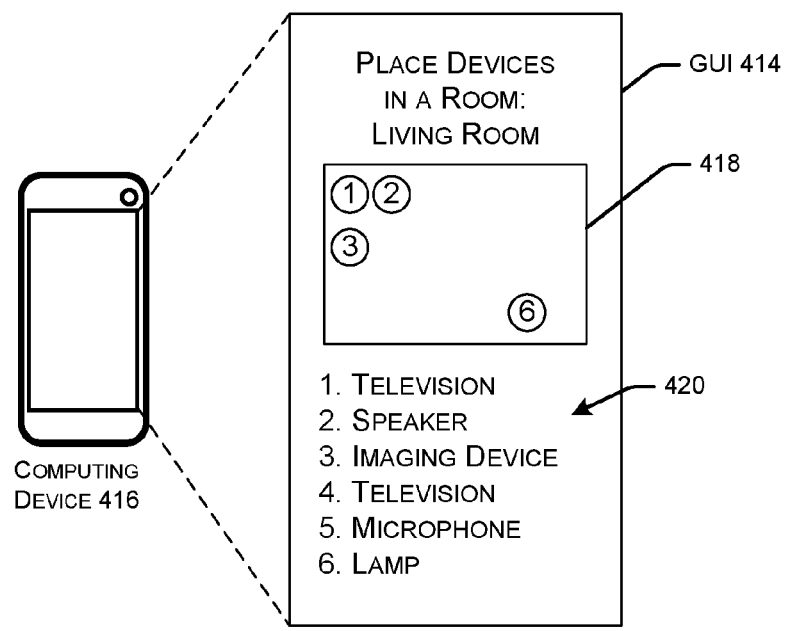
FIG. 4B shows an example GUI that a user may utilize to place devices in a room, such as a living room, which may be functionally grouped for communication.

Further, in some instances, the user locator module 226 may have information regarding the layout of the environment 302, include details regarding which devices are in which zones, the relationship between zones (e.g., which rooms are adjacent), and/or the placement of individual devices within each zone. In some instances, a user may utilize a GUI to add devices to the environment, to add zones to an environment, and/or to place devices within particular zones, as illustrated in FIGS. 4A and 4B. In some instances, the user locator module 226 can leverage knowledge of the relationships between zones and the devices within each zone to increase a confidence level of user identity and location as a user moves about the environment 302. For example, in a case where the user 322 is in zone 110(3), and subsequently moves beyond a field of view of the imaging device 340 into the zone 110(2), the user locator module 226 may infer a location and/or identity of the user to determine with a high confidence level (in combination with data from one or more other devices) that any motion detected by the motion sensor 338 corresponds to movement by the user 322.

In some instances, the vision module 308 may receive data from one or more sensors capable of providing images (e.g., such as the imaging devices 328, 340, 356 and the computing devices 324 and 334) or sensors indicating motion (e.g., such as the motion sensor 338). In some instances, the vision module 308 can perform facial recognition or image analysis to determine an identity of a user and to associate that identity with a user profile associated with the user. In some instances, when a user (e.g., the user 322 "Bob") is facing the imaging device 340, the vision module 308 may perform facial recognition and identify the user 322 with a high degree of confidence. In some instances, the vision module 308 may have a low degree of confidence of an identity of a user, and the user locator module 226 may utilize determinations from additional modules to determine an identity and/or location of a user. In some instances, the vision module 308 can be used in conjunction with other modules to determine when a user is moving to a new location within the environment 302. In some instances, the vision module 308 can receive data from one or more imaging devices to determine a layout of a zone or room, and/or to determine which devices are in a zone and where they are located.

In some instances, the audio module 310 may receive data from one or more sensors capable of providing an audio signal (e.g., the voice-controlled devices 332 and 348, the microphones 336 and 360, the computing devices 324 and 334, the set-top box 346) to facilitate locating a user. In some instances, the audio module 310 may perform audio recognition on an audio signal to determine an identity of the user and an associated user profile. Further, in some instances, the imaging devices 328, 340, and 356 may provide an audio signal to the audio module 310. In some instances, the audio module 310 is configured to receive an audio signal from one or more devices and may determine a sound level or volume of the source of the audio. In some instances, if multiple sources of audio are available, the audio module 310 may determine that two audio signals correspond to the same source of sound, and may compare the relative amplitudes or volumes of the audio signal to determine a location of the source of sound. In some instances, individual devices may include multiple microphone and may determine a direction of a user with respect to an individual device. As discussed above, in some instances, aspects of the network device 304 may be configured at a computing device (e.g., a local network device) within the environment 302. Thus, in some instances, the audio module 310 operating on a computing device in the environment 302 may analyze all sound within the environment 302 (e.g., without requiring a wake word) to facilitate locating a user. In some instances, the audio module 310 may perform voice recognition to determine an identity of a user.

In some instances, the environment 302 may include biometric sensors that may transmit data to the biometric module 312. For example, the biometric module 312 may receive data corresponding to fingerprints, iris or retina scans, thermal scans, weights of users, a size of a user, pressure (e.g., within floor sensors), etc., and may determine a biometric profile corresponding to a user. In some instances, the biometric module 312 may distinguish between a user and sound from a television, for example. Thus, the biometric module 312 may incorporate biometric information into a confidence level for determining an identity and/or location of a user. In some instances, the biometric information from the biometric module 312 can be associated with a specific user profile such that the biometric information uniquely identifies a user profile of a user.

In some instances, the radio frequency (RF) module 314 may use RF localization to track devices that a user may carry or wear. For example, as discussed above, the user 320 (and a user profile associated with the user) may be associated with a computing device 324. The computing device 324 may emit RF signals (e.g., Wi-Fi, Bluetooth®, etc.), which are illustrated as signals 362 and 364. As illustrated, the appliance 354 may detect the signal 362 and the access point 352 may detect the signal 364. In some instances, the access point 352 and the appliance 354 may indicate to the RF module 314 the strength of the signals 364 and 362 (e.g., as a received signal strength indication (RSSI)), respectively. Thus, the RF module 314 may compare the RSSI for various signals and for various appliances and may determine an identity and/or location of a user (with an associated confidence level). In some instances, the RF module 314 may determine that a received RF signal is associated with a mobile device that is associated with a particular user. In some instances, a device (e.g., the access point 352) may be configured with multiple antennas to determine a location of a user relative to the device using beamforming or spatial diversity techniques. In such a case, the RF module 314 may receive an indication of the direction of the user relative to an individual device.

As illustrated, the appliance 330 may receive a signal 366 from the RF device 326 associated with the user and a user profile, while the access point 352 may receive a signal 368. Further, the appliance 354 can receive a signal 370 from the RF device 326. In an example where there is some uncertainty about an identity of the users in zones 110(3) and 110(4), the RF module 314 may determine that the RSSI of the signals 362, 364, 366, 368, and/or 370 increases or decreases a confidence level of an identity and/or location of the users, such as the user 320 and 324. For example, if an RSSI of the signal 362 is higher than the RSSI of the signal 370, the RF module may determine that it is more likely that a user in the zone 110(4) is the user 320 than the user 322. In some instances, a confidence level of the determination may depend on a relative difference of the RSSIs, for example.

In some instances, the machine learning module 316 may track the behavior of various users in the environment as a factor in determining a confidence level of the identity and/or location of the user. By way of example, it may be the case that the user 320 adheres to a regular schedule, such that the user 320 is outside the environment 302 during the day (e.g., at work or at school). In this example, the machine learning module 316 would factor in past behavior and/or trends into determining the identity and/or location. Thus, the machine learning module 316 may user historical data and/or usage patterns over time to increase or decrease a confidence level of an identity and/or location of a user.

In some instances, the location confidence module 318 receives determinations from the various modules 308, 310, 312, 314, and 316, and may determine a final confidence level associated with the identity and/or location of a user. For example, the confidence level of the location confidence module 318 may be used to facilitate a functionally grouped device. For example, if a confidence level of a user is high, the functionally grouped device may be configured to provide a video call. In some instances, when a confidence level is low, a functionally grouped device may be configured to initiate a voice call before transitioning to a video call. In some instances, based on a confidence level, an indication may be sent to a computing device associated with a user to confirm a location of the user or to confirm whether the user wants to engage in a communication involving a functionally grouped device. In some embodiments, the confidence level may determine whether an action is performed. For example, if a user request includes a request to unlock a door, a confidence level may need to be above a threshold that may be higher than a confidence level needed to perform a user request associated with playing a playlist or resuming a location in an audiobook, for example.

FIG. 4A shows an example graphical user interface (GUI) 400 that a user may utilize to configure devices in an environment to be functionally grouped for communication. In some instances, the GUI 400 may be displayed on a computing device 402, such as a smartphone, tablet, laptop, or desktop computer. As illustrated, the GUI 400 includes an "Add Device" icon 404, an "Add Room" icon 406, a "Place Devices in a Room" icon 408, a "Device Information" icon 410, and a "Call Preferences" icon 412. These icons 404, 406, 408, 410, and 412 are merely illustrative and additional icons and/or functions may be provided in the GUI 400.

In some instances, the "Add Device" icon 404 may be activated to present an interface for a user to add devices to the system. For example, a user may individually add devices to the group of devices, or the system may automatically detect devices that are compatible with the system. In some instances, as devices are added to the system or network, various drivers and/or communication protocols are updated within the system to allow the various devices to interact and/or to form a functionally grouped device.

In some instances, the "Add Room" icon 406 may be activated to present an interface for a user to add additional rooms or zones to an environment, such as the environment 108 of FIG. 1. For example, the user may add a room and may provide a title for the room, such as "Living Room," "Kitchen," "Office," etc. In some instances, an interface may be provided to locate the various rooms relative to other rooms in an environment. In some instances, the relationship between rooms may be determined by the network device, for example, by monitoring movement between rooms as users are present in image data from various imaging devices, for example.

In some instances, the "Place Devices in a Room" icon 408 may be activated to present an interface for a user to position various devices that are associated with the system within various rooms or zones in an environment. For example, an illustrative interface presented in response to activating the icon 408 is shown in FIG. 4B.

In some instances, the "Device Information" icon 410 may be activated to present an interface for a user to specify particular device information associated with individual devices of the environment. For example, a user may specify whether individual devices are to be used to generate or output audio or video, respectively. In some embodiments, the icon 410 may be activated to present information to the user corresponding to the various device capabilities of the individual devices.

In some instances, the "Call Preferences" icon 412 may be activated to present an interface for a user to specify preferences or rules for communication for various contacts (e.g., users), for utilizing individual devices in a functionally grouped device, etc. For example, the "Call Preferences" icon 412 may be used to specify a preference for a voice call or a video call; whether a confirmation request is to be presented on a computing device associated with a user before communicating via a functionally grouped device; a preference for a particular display in a zone including multiple displays; etc.

FIG. 4B shows an example GUI 414 that a user may utilize to place devices in a room, such as a living room, which may be functionally grouped for communication. In some instances, the GUI 414 presented on a computing device 416 may correspond to the interface presented upon activating the icon 408. As illustrated, the GUI 414 may include a map 418 of a room titled "Living Room," whereby a user may select devices listed in the list 420 for placement within the map 418. In some instances, the GUI 414 may allow a user to provide an image of a particular zone (e.g., the living room) and may indicate on the image the location the location of the various devices. For example, a user may take a picture of their living room and may tag the various components in the image. Thus, using the GUI 414, a user may specify which particular devices are included in a particular zone, and may specify a relative placement within the zone to facilitate subsequent functional grouping of device. In some instances, a layout of a room and/or devices within a room may be determined by an imaging device (such as the imaging device 340) located in a particular zone. As illustrated, the list 420 may include additional devices within an environment that are not present in the particular zone. For example, the device "(5) Microphone" may be present in another room. As may be understood, the computing device 416 may present various GUIs for the various rooms and/or zones of the environment such that some or all of the devices may be placed on a map.

Figure 5:
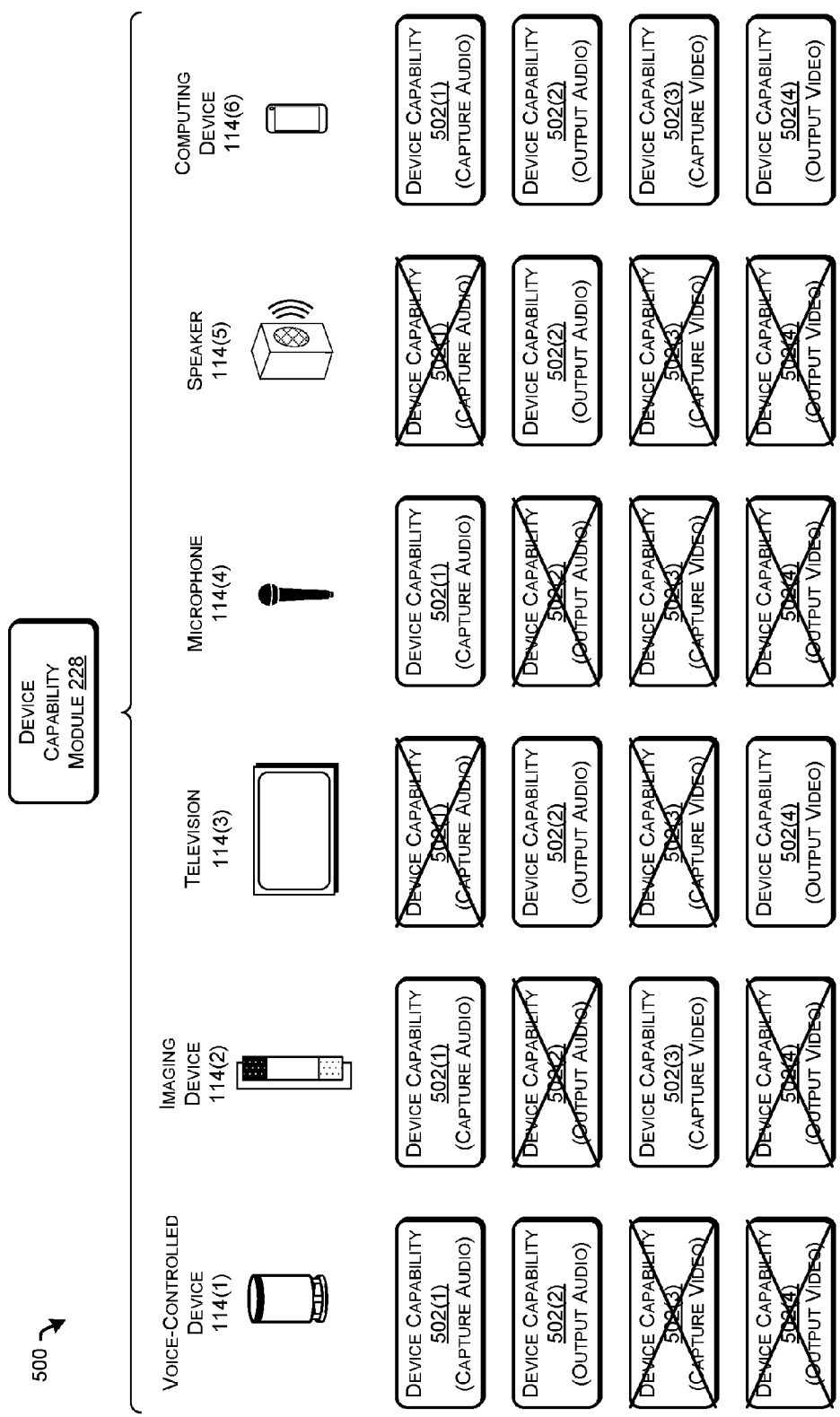
FIG. 5 illustrates an example where a device capability module determines device capabilities of devices in an environment.

FIG. 5 illustrates an example 500 where the device capability module 228 determines device capabilities of devices in an environment. In this example, the predefined device capability 502(1) represents the ability of a device to capture audio within an environment, the predefined device capability 502(2) represents an ability of a device to output audio (as sound) within an environment, the predefined device capability 502(3) represents an ability of a device to capture video within an environment, and the predefined device capability 502(4) represents an ability of a device to output video (e.g., on a display or projector) within an environment.

In some instances, the predefined device capabilities 502 may correspond to drivers or protocols stored in the device capability module 228. For example, the device capability module 228 may store an audio driver associated with the microphone 114(4) to process the audio captured by the microphone 114(4) in the environment. In some instances, the device capability module 228 may store additional technical features associated with each device, such as bit rates, codecs, color gamuts, frequency responses, resolutions, a network protocol, an availability status, etc.

Figure 6:
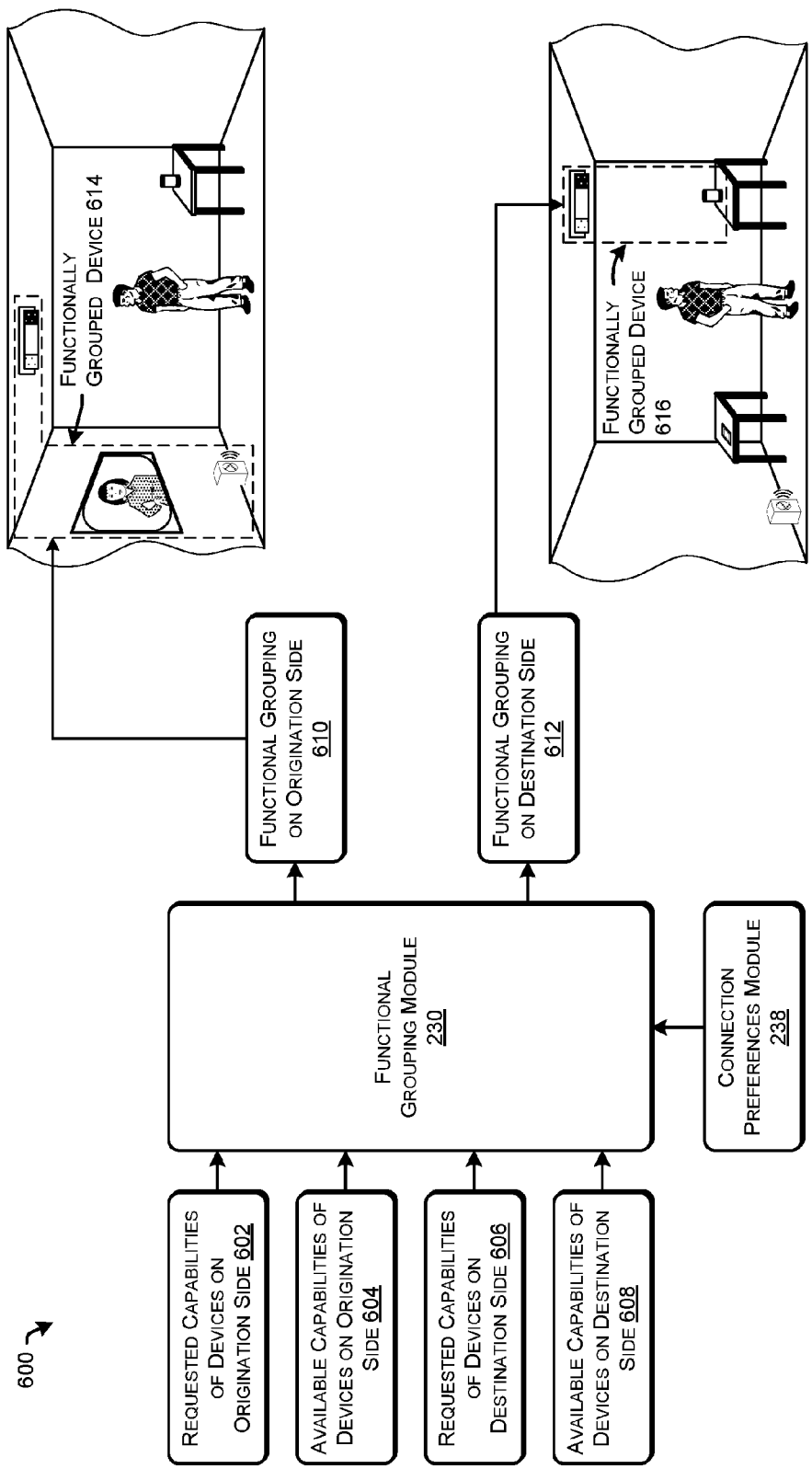
FIG. 6 illustrates an example where a functional grouping module determines functionally grouped devices based on requested capabilities of devices and available capabilities of devices.

FIG. 6 illustrates an example 600 where the functional grouping module 230 determines functionally grouped devices based on requested capabilities of devices and available capabilities of devices. For example, the functional grouping module 230 receives as inputs the requested capabilities of devices on the origination side 602, the available capabilities of devices on the origination side 604, the requested capabilities of devices on the destination side 606, and the available capabilities of devices on the destination side 608. Further, the functional grouping module 230 may receive preferences from the user, for example, via the connection preferences module 238, to facilitate selecting particular devices for a functionally grouped device based on preferences associated with the user profile of the user. As outputs, the functional grouping module 230 may provide a functional grouping on the origination side 610 and the functional grouping on the destination side 612.

By way of example, the requested capabilities of devices on the origination side 602 may reflect that a video call is requested to be initiated on the origination side. For example, a video call may require devices with the capabilities to generate and output audio and video. However, in some instances, the available capabilities of devices on the origination side 604 may not include all the capabilities indicated in 602. In this example, the requested capabilities 602 correspond to the available capabilities 604, and thus the functional grouping on the device side 610 is represented as the functionally grouped device 614 in the example 600. As illustrated, the functionally grouped device 614 may include a subset of devices of a plurality of devices that are present in a particular zone or room on the origination side.

By way of another example, the requested capabilities of devices on the destination side 606 may reflect that a video call is requested to be initiated on the destination side. However, in some instances, the available capabilities of devices on the destination side 608 may not include all the capabilities indicated in 606. In this example, the requested capabilities 606 do not correspond to the available capabilities 608, and thus the functional grouping on the device side 612 is represented as the functionally grouped device 616 in the example 600. As illustrated, the functionally grouped device 616 does not output video.

In some instances, devices to be included in a functionally grouped device may include one or more secondary devices, such as a light or lamp, which may be used in connection with the devices for communication. For example, a lamp may be selected as a device to be included in a functionally grouped device such that the lamp is turned on when a video communication is requested to improve a quality of video. In some instances, a separate audio device in use (e.g., one currently playing music) may be included in the functionally grouped device, such that the sound generated by the separate audio device is reduced or muted to facilitate a voice communication.

Figure 7:
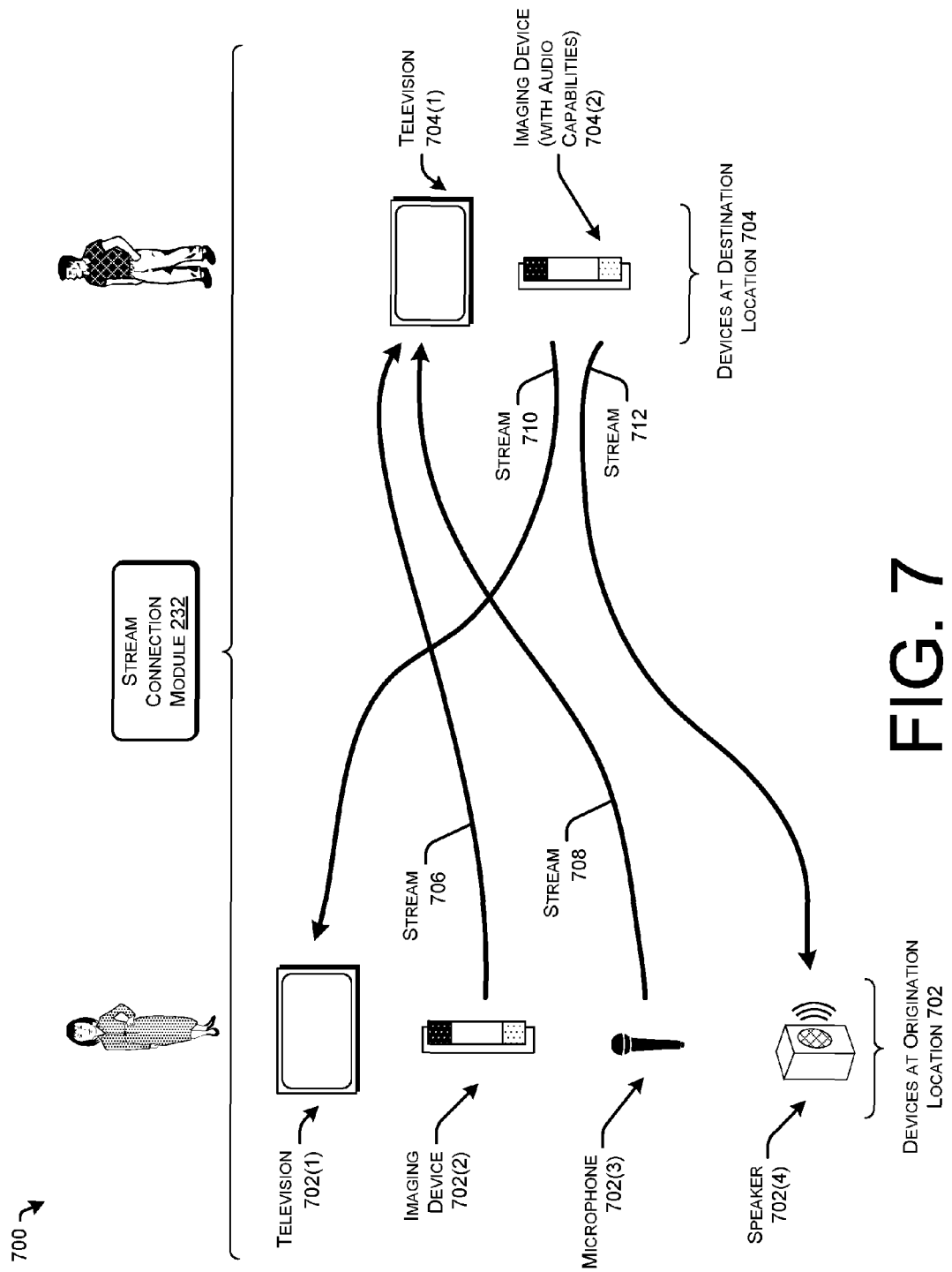
FIG. 7 illustrates an example where a stream connection module connects audio and video streams between devices at an origination location and a destination location.

FIG. 7 illustrates an example 700 where the stream connection module 232 connects audio and video streams between devices at an origination location 702 and devices at a destination location 704. For example, the devices at the origination location 702 may include a television 702(1), an imaging device 702(2), a microphone 702(3), and a speaker 702(4), which collectively facilitates a video call with the devices at the destination location 704. For example, the devices at the destination location 704 may include a television 704(1) and an imaging device 704(2).

In some instances, steams may be negotiated by the stream connection module 232 between the devices at the destination location 702 and the devices at the destination location 704. For example, the imaging device 702(2) may capture video represented at a stream 706 to be transmitted to the television 704(1) at the destination location. In some instances, the imaging device 702(2) may determine a video resolution based upon the capabilities of the television 704(1), which may be negotiated by the stream connection module 232. In some instances (where there are multiple devices at the destination location 704 that may output video), a device to output video may be selected based on a similarity between one or more of a codec, bit rate, resolution, etc. of the imaging device on the origination side and the video output device on the destination side. Further, the microphone 702(3) may capture audio as a stream 708 to be transmitted to the television 704(1), which may include one or more speakers. In some instances (where there are multiple devices at the origination location that may capture audio), an audio capture device may be selected to provide the highest quality audio (e.g., loudest audio, least noise, etc.). Thus, as illustrated, individual streams 706 and 708 can be generated independently at the origination location and combined by the stream connection module 232 such that a single stream may be provided to a corresponding device on the destination location. Similarly, the imaging device 704(2) with audio and video capabilities may capture audio and video represented as streams 710 and 712 to be delivered to individual devices represented as the television 702(1) and the speaker 702(4).

In some instances, as a user moves from a first location in a first environment to a second location in the first environment (e.g., the origination location), the stream connection module 232 (e.g., in conjunction with the connection transfer module 236) may facilitate a transition between devices at the origination location, and may facilitate a transition of the streams at the destination location. For example, a device outputting audio at the destination location may receive two audio streams (e.g., from the first location and the second location) and may blend the streams to output sound representing a contribution from both audio streams. In some instances, a contribution of each stream may depend on a confidence level that a user is located in the particular location, and in some instances, the audio streams may fade from one stream to another over a period of time. Similarly, a device outputting video at the destination location may receive two video streams (e.g., from the first location and the second location) and may blend the streams to output video corresponding to both video streams. For example, during a transition, a video output device at the destination location may provide a split screen to display both video streams simultaneously.

Figure 8A:
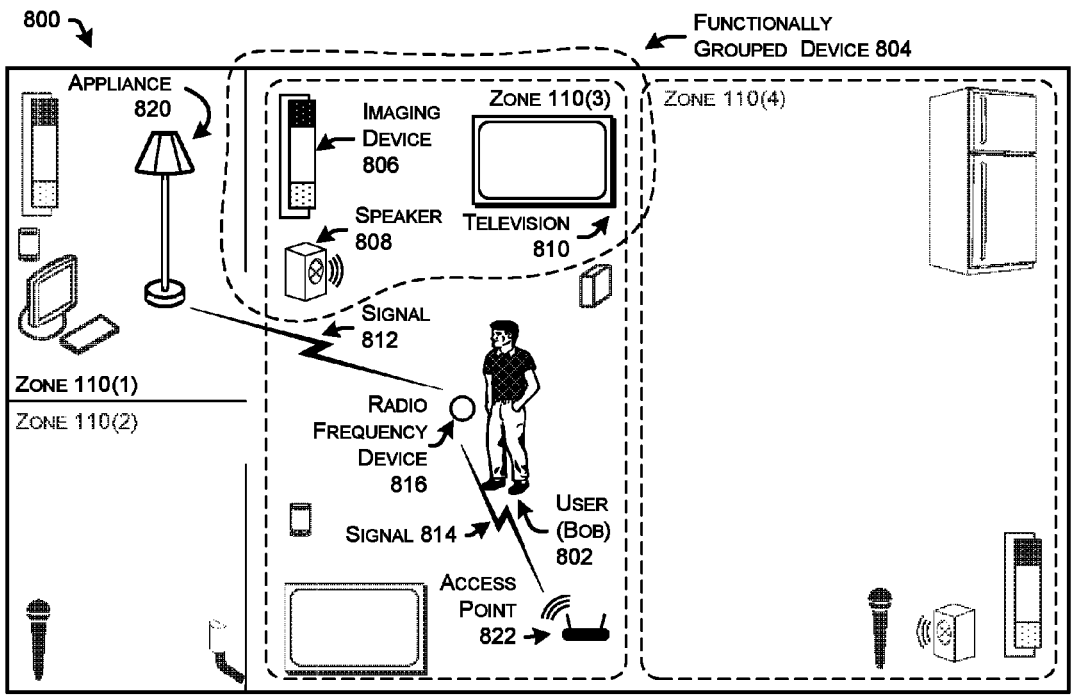
FIG. 8A illustrates a schematic diagram of determining a functionally grouped device at a first location.

FIG. 8A illustrates a schematic diagram 800 of determining a functionally grouped device at a first location. For example, a user 802 "Bob" may be in the zone 110(3) and may be engaged in a video call utilizing a functionally grouped device 804 comprising an imaging device 806, a speaker 808, and a television 810. As illustrated, the zone 110(3) may include other individual devices that are not configured to be utilized in the functionally grouped device 804. In some instances, the identity and/or location of the user 802 may be determined via one or more of facial recognition or audio recognition provided by the imaging device 806, or via RF identification provided by the analysis of signals 812 and 814 generated by the RF device 816. For example, an appliance 820 and an access point 822 may receive the signals 812 and 814, respectively, and may approximate an identity and/or location of the user 802 in the zone 110(3) based on the strength of the signals and/or based on the presence of the signals 812 known to be associated with the user 802.

Figure 8B:
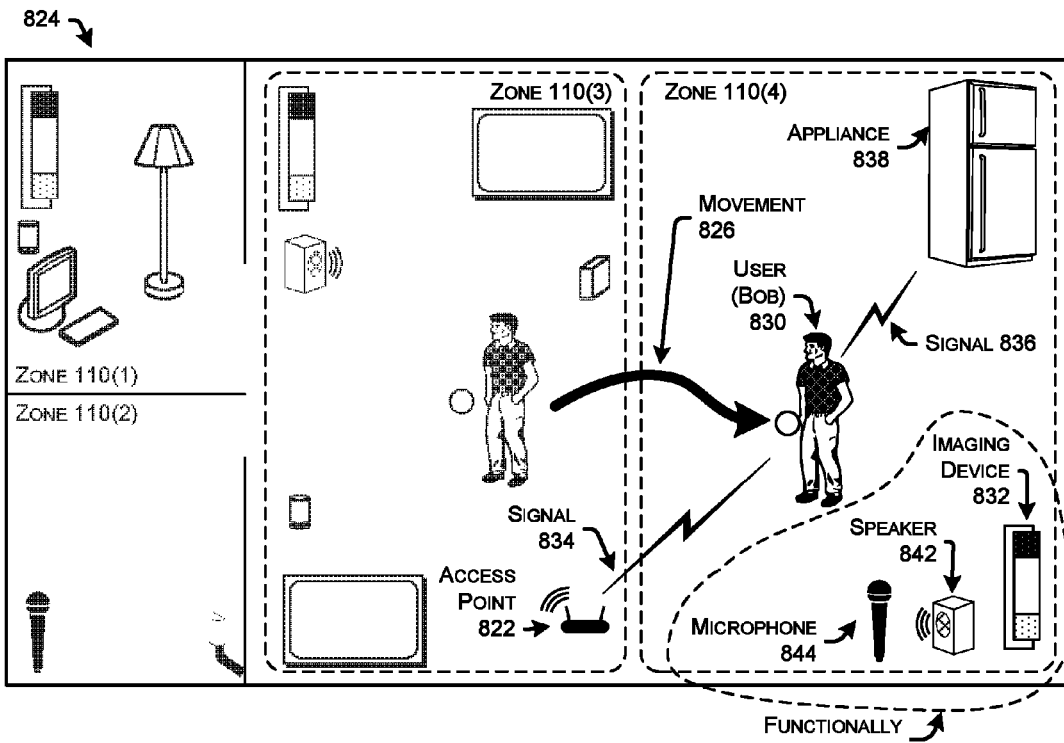
FIG. 8B illustrates a schematic diagram of determining a new functionally grouped device as a user moves from the first location to a second location.

FIG. 8B illustrates a schematic diagram 824 of determining an additional functionally grouped device as a user moves from the first location to a second location within an environment. For example, as the user 802 moves from the zone 110(3) in FIG. 8A via the movement path 826, the user 802 may be referred to as a user 830 in the zone 110(4). In some instances, as the user 802 moves from the zone 110(3) to the zone 110(4), the user may leave a field of view of the imaging device 806 and enter into a field of view of an imaging device 832 located in or associated with the zone 110(4). As described above, an identity and/or location of the user 830 may not be known with complete certainty, but the identity and/or location may be associated with a confidence level determined by evaluating sensor data from a variety of devices and/or sensors. For example, the imaging device 832 may indicate that a user has entered the zone 110(4). In some instances, the RF device 816 associated with the user 830 may transmit signals 834 and 836 that may be received by the access point 822 and an appliance 838, respectively. As described above, a network device may evaluate a strength of the signals 834 and 836 (e.g., compared to a strength of the signals 812 and 814) to provide additional data about the location of the user 830 in the zone 110(4). When the user 830 is determined to be in the zone 110(4), a communication taking place via the functionally grouped device 804 may transfer to another functionally grouped device 840, which may include the imaging device 832, a speaker 842, and a microphone 844. In some instances, the device capabilities at the first location (e.g., zone 110(3)) and the second location (e.g., zone 110(4)) may not correspond, and the transfer process may include upgrading or downgrading the conversation. For example, the conversation illustrated in FIG. 8A includes a video call, while the conversation illustrated in FIG. 8B may include a voice call.

FIGS. 1 and 9-11 illustrate example processes in accordance with embodiments of the disclosure. Each process described herein is illustrated as a logical flow graph, each operation of which represents a sequence of operations that can be implemented in hardware, software, or a combination thereof. In the context of software, the operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media can include non-transitory computer-readable storage media, which can include hard drives, floppy diskettes, optical discs, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some embodiments the computer-readable media can include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

Figure 9:
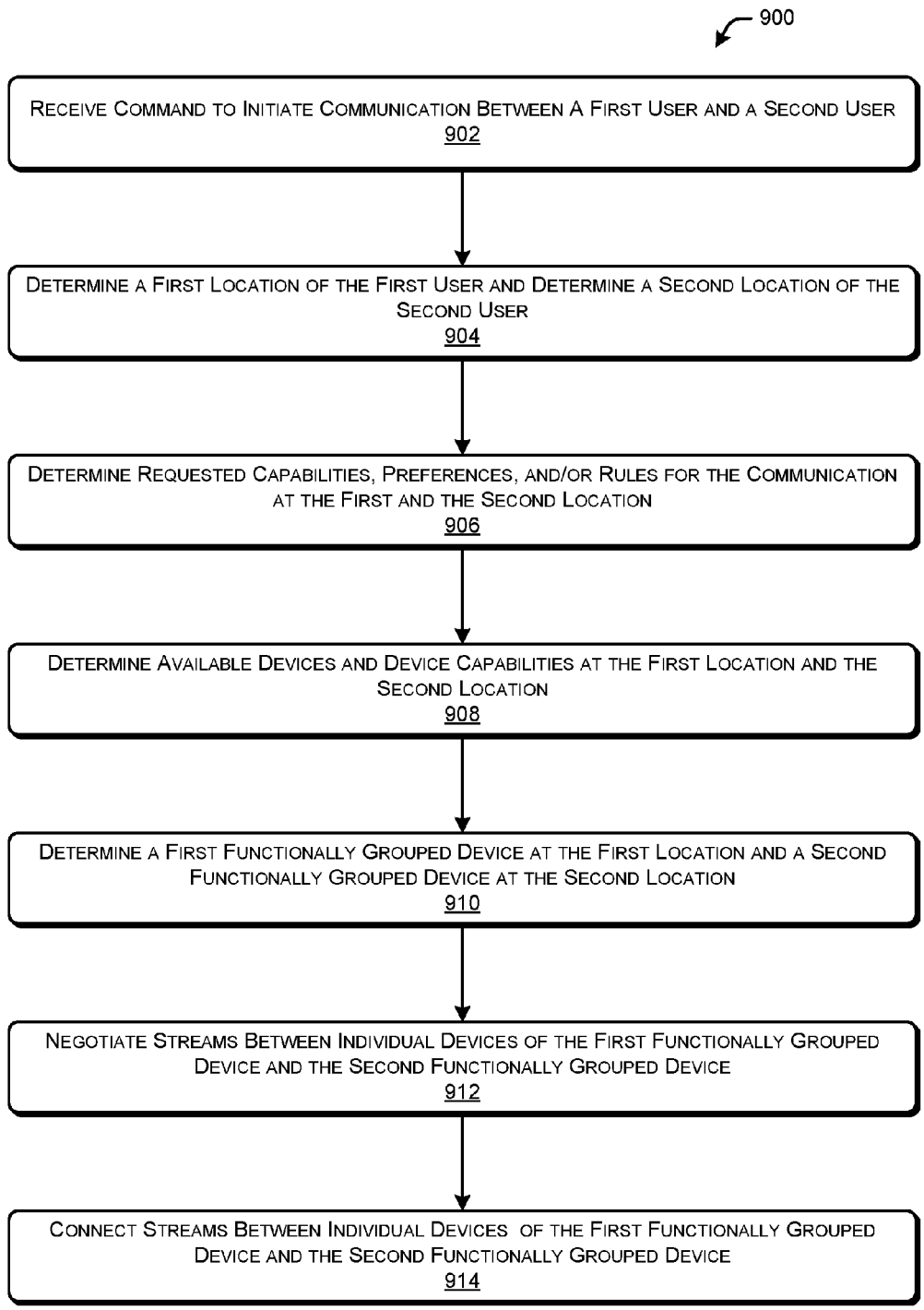
FIG. 9 illustrates an example flow diagram of a process for receiving a command to initiate communication between a first and a second user, determining the locations of the users, and communicating using functionally grouped devices at the locations of the users based on communication requirements, communication preferences, and device capabilities at the locations.

FIG. 9 illustrates an example flow diagram of a process 900 for receiving a command to initiate communication between a first and a second user, determining the locations of the users, and communicating using functionally grouped devices at the locations of the users based on communication requirements, communication preferences, and device capabilities at the locations. For example, aspects of the process 900 can be performed by the network device 208, as illustrated in FIG. 2.

At 902, the operation may include receiving a command to initiate communication between a first user and a second user. For example, the command may include a natural-language command, a gesture, and/or a GUI request associated with a computing device. In some instances, the command to initiate the communication may refer only to the individual users, and not to the devices associated with the users. In some instances, the request may specify a mode of communication (e.g., voice or video), while in some instances, the mode of communication may not be specified. In some instances, the operation 902 may include performing automated speech recognition on a natural-language command to determine text corresponding to speech contained in an audio signal, and in some instances, the command may be determined from the determined text.

At 904, the operation may include determining a first location of the first user and determining a second location of the second user. For example, the first user may correspond to a user initiating the communication in the operation 902. In some instances, the location of the first user may be determined by operations and processes at the first location independent of any operations associated with the second user. That is to say, aspects of the process 900 may be performed in parallel for operations associated with the first user and for operations associated with the second user. For example, as discussed above, in some instances, the operations of the network device 208 may be distributed between a remote network device and a local network device located at an environment associated with a user. Thus, when the command is received in the operation 902, an indication to locate the first user may be transmitted to a local network device associated with the first user, and an indication to locate the second user may be transmitted to a local network device associated with the second user. In some instances, a location of a user is continuously monitored and stored in memory. Thus, when a communication is requested between a first user and a second user, for example, the stored locations of the users are used to determine a functionally grouped device. As a location of a user changes, the location may be updated in memory, such as memory of the network service 208. In some instances, the operation 904 may be performed via face recognition, voice recognition, analyzing RF signals, etc., as described above in connection with FIG. 3. Further, processes for determining a location of a user are described in connection with FIG. 10.

At 906, the operation may include determining requested capabilities, preferences, and/or rules for the communication at the first and the second locations. For example, the communication requested by the command (in the operation 902) may specify either a voice call or a video call. In some instances, the type of call may be ascertained by the identities of the parties. In some instances, various rules may specify what type of communication to be initiated. For example, requirements, preferences, and/or rules for the communication may specify whether audio or video is to be captured or output at the first location and/or the second location.

At 908, the operation may include determining available devices and device capabilities at the first location and the second location. For example, this operation may include determining the individual devices at the respective locations and which devices are capable of generating or outputting audio or video.

At 910, the operation may include determining a first functionally grouped device at the first location and a second functionally grouped device at the second location. For example, each of the functionally grouped devices may be determined independently at the first and second locations, respectively.

At 912, the operation may include negotiating streams between individual devices of the first functionally grouped device and the second functionally grouped device. For instance, negotiating a stream may include determining a bit rate, codec, frame rate, color depth, resolution, etc., of a stream of audio or video. For example, a device such as a microphone at the first location may negotiate with a speaker at the second location to provide audio at a bit rate and/or using a codec that is compatible with the speaker. In some instances, one location may include devices or capabilities that may not be matched at the other location. For example, the first location may include an imaging device, but the second location may not include a display. In such a case, the video stream from the imaging device may be paused, stopped, and/or canceled.

At 914, the operation includes connecting streams between individual devices of the first functionally grouped device and the second functionally grouped device. An example of this operation is described above in connection with FIG. 7.

Figure 10:
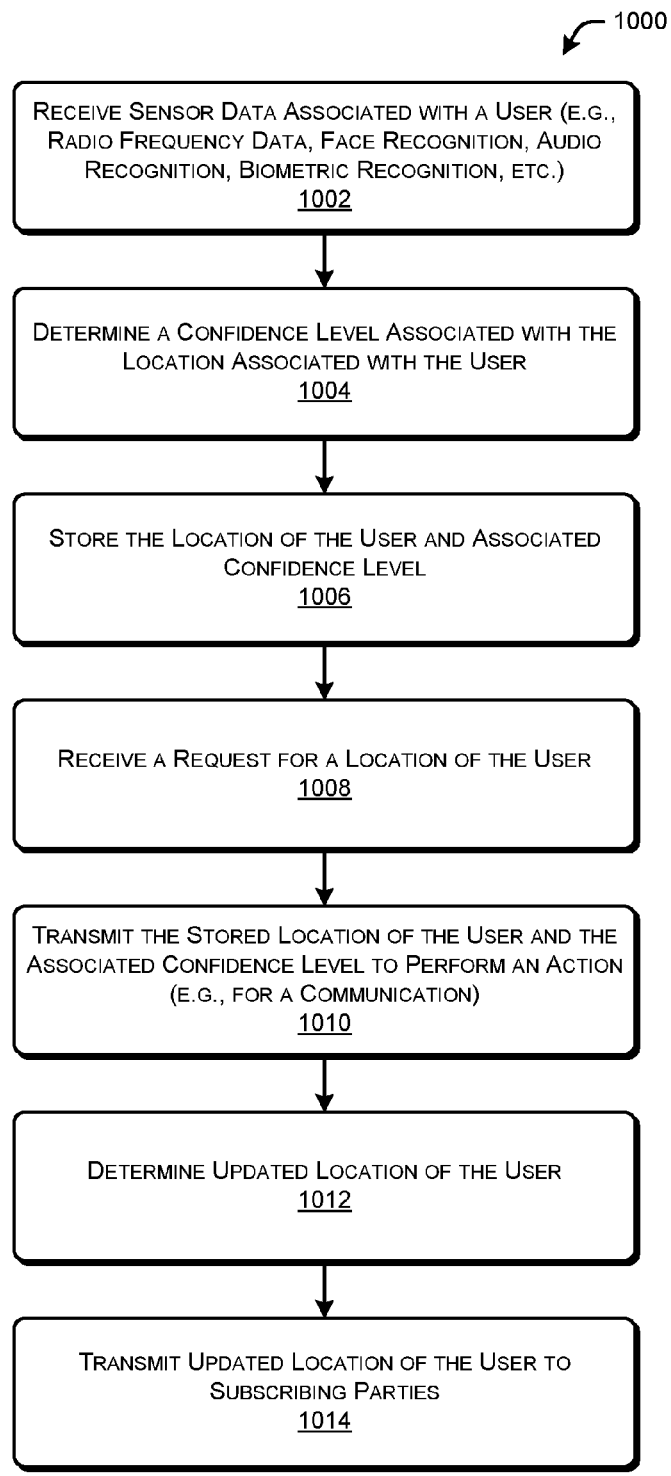
FIG. 10 illustrates an example flow diagram of a process for determining a location of a user including receiving sensor data, determining a confidence level of a location, and returning a location of the user based on the sensor data.

FIG. 10 illustrates an example flow diagram of a process 1000 for determining a location of a user including receiving sensor data, determining a confidence level of a user at a location, and returning a location of the user based on the sensor data. For example, aspects of the process 1000 can be performed by the network device 208 and 304, as illustrated in FIGS. 2 and 3.

At 1002, the operation may include receiving sensor data associated with the user (e.g., radio frequency data, face recognition, audio recognition, biometric recognition, etc.). For example, sensor data may be received from devices illustrated in FIG. 3, and described above. For example, sensor data may be received from one or more devices including, but not limited to, televisions, set-top boxes, microphones, speakers, audio systems, imaging devices, computers, computing devices, smartphones, telephones, tablets, modems, routers, lights, dishwashers, washing machines, coffee machines, refrigerators, door locks, window blinds, thermostats, garage door openers, air-conditioning units, alarm systems, motion sensors, biometric sensors, pressure sensors, radio frequency sensors, ovens, microwaves, and the like. In some instances, the operation 1002 may be performed continuously at one or more locations associated with a user, to provide updated sensor data to locate a user.

At 1004, the operation may include determining a confidence level associated with the location associated with the user. For example, as discussed in connection with FIG. 3, individual sensors may provide varying degrees of confidence in an identity and/or location of a user. For example, data associated with a RF signal associated with a user device may provide a confidence level separate from one provided by an imaging device configured to provide facial recognition. As sensor data with individual confidence levels are combined, a determination of the identity and/or location of the user can be provided with a single confidence level associated with the user.

At 1006, the operation may include storing the location of the user and the associated confidence level. For example, the location information may be stored in a memory of a network device, such as the network device 208. In some instances, the operations 1002, 1004, and 1006 may be performed continuously to track a location of a user in an environment. Also, as discussed, above, the operations in the process 1000 may be performed in parallel to identify a first user at a first location and a second user at a second location.

At 1008, the operation may include receiving a request for a location of a user. In some instances, as discussed above, the request may be received by a network device operating in an environment associated with a user. In some instances, the request may ultimately originate from a user requesting to initiate a communication between two users, for example. In some instances, when a request for a user location is receive from a requesting party, the requesting party may be considered to be "subscribed" to the user such that updates in a location of a user (e.g., "location events") may be provided to the requesting party. In some instances, the request for a communication may be received before a location of a user is determined. That is, in some instances, a location of a first user is determined in response to a second user requesting a conversation with that first user. In some instances, a location of the first user is determined only after the first user acknowledges the request and/or has indicated in a user profile that the first user will allow location tracking to be performed.

At 1010, the operation may include transmitting the stored location of the user and the associated confidence level to perform an action, such as for a communication. In some instances, the stored location corresponds to the location stored in the operation 1006. In some instances, the location of the user may be provided for a variety of actions or tasks, such as for presenting content (e.g., video or audio) on a functionally grouped device, unlocking a door, etc. That is, aspects of this disclosure are applicable to actions and tasks beyond communications between two parties.

At 1012, the operation may include determining an updated location of the user. For example, the sensors at a location may continuously track a location of the user as the user moves about an environment. When a user changes zones (e.g., moves between rooms) or when a user changes locations within a room, this movement may generate a location event. The updated location may be stored as the current location, and at operation 1014, the operation may include transmitting the updated location of the user to subscribing parties. For example, if a first user is initiating a communication with a second user, the first user can be said to be "subscribing" to receive updated location information relating to the second user. Thus, providing a location of a user may be based on a specific request for a location of a user, or may be event driven, such that an updated location is broadcast to subscribing parties.

Figure 11:
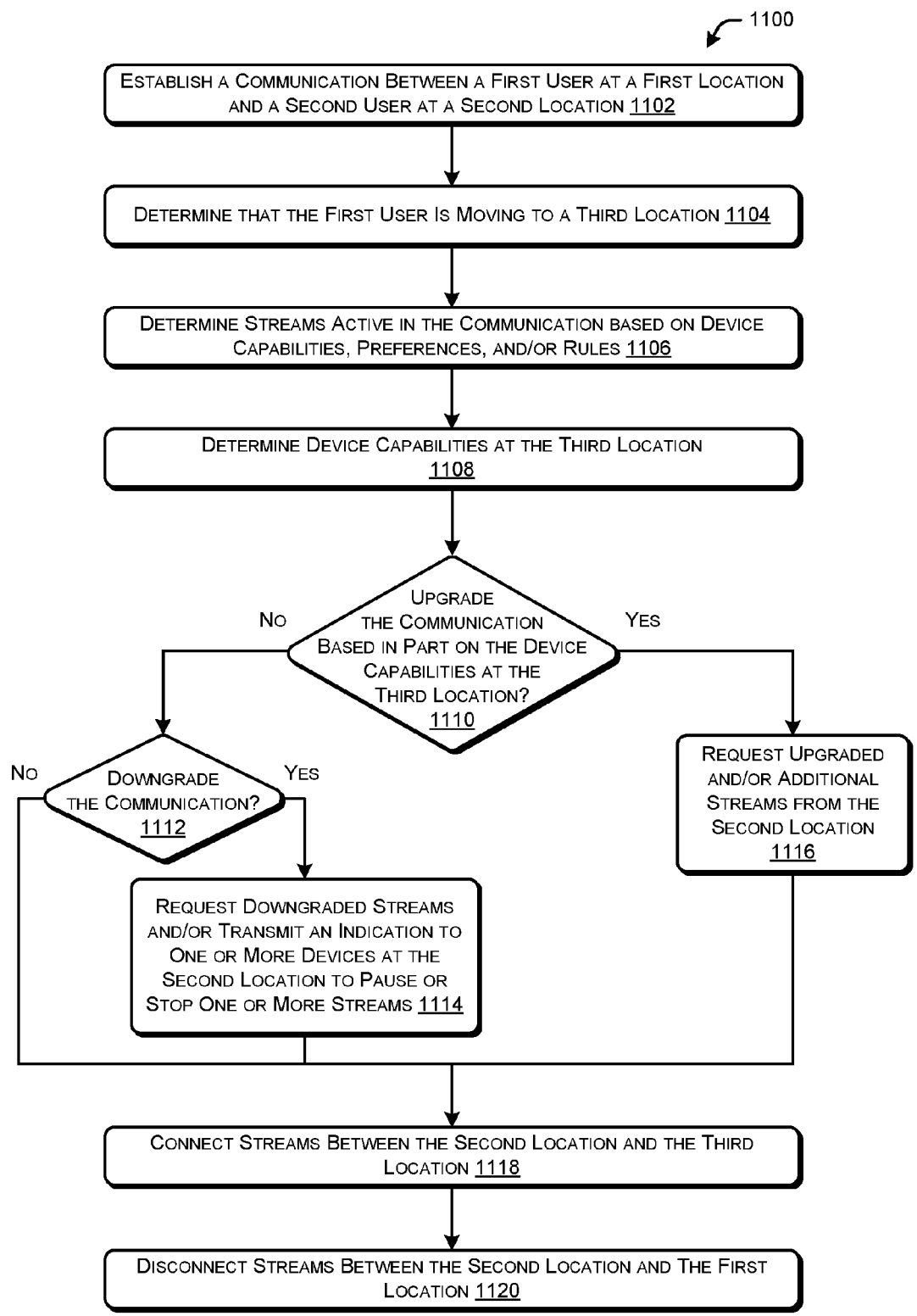
FIG. 11 illustrates an example flow diagram of a process for forming a new functionally grouped device as a user moves from a first location to a third location during a communication.

FIG. 11 illustrates an example flow diagram 1100 of a process for forming a new functionally grouped device as a user moves from a first location to a third location during a communication. For example, aspects of the process 1100 can be performed by the network device 208 and 310, as illustrated in FIGS. 2 and 3.

At 1102, the operation may include establishing a communication between a first user at a first location and a second user at a second location. In some instances, this operation may include locating the users and establishing functionally grouped devices, as discussed herein. At 1104, the operation may include determining that the first user is moving to a third location. For example, this operation may include monitoring sensor data as described in FIGS. 3, 8A, 8B, and 11. At 1106, the operation may include determining streams that are active in the communication based upon device capabilities, preferences, and/or rules. For example, active streams may include video and/or audio streams between the first location and the second location, as described in connection with FIG. 7. At 1108, the operation may include determining device capabilities at the third location. For example, this may include determining which individual devices are present at the third location and/or whether the devices are capable of generating and/or outputting audio or video.

At 1110, the operation may include a determination of whether to upgrade the communication based in part on the device capabilities at the third location. In some instances, it may not be possible and/or one or more user preferences and/or rules may prevent the conversation from being upgraded. Thus, following a "No" decision in the operation 1110, the operation continues to operation 1112.

At 1112, the operation may include a determination of whether to downgrade the communication. In some instances, the operation 1112 may be based at least in part on the capabilities of the devices at the third location. If, for example, the devices at the third location include comparable capabilities as the devices at the first location, the operation 1112 may result in a "No" determination, there may be no need to upgrade or downgrade the communication. If the devices at the third location include capabilities that are deficient compared to the capabilities of the devices the first location, the operation 1112 may result in a "Yes" determination, and the process may proceed to operation 1114.

At 1114, the operation may include requesting one or more downgraded streams and/or transmitting an indication to one or more devices at the second location to pause or stop on or more streams. For example, streams may be downgraded by reducing a bit rate, resolution, etc., depending on the type of communication (e.g., audio or video). If, for example, the first location includes devices and capabilities for a video call, while the third location lacks a display, the operation 1114 may include transmitting an indication to an imaging device at the second location, for example, to pause or stop the video stream.

Turning back to the operation 1110, if the device capabilities at the third location are superior to the device capabilities at the first location, the operation may result in "Yes," and the process 1110 may continue to operation 1116. At 1116, the operation may include requesting an upgraded stream and/or one or more additional stream from the second location. For example, if the first location supported a voice call and the third location supports a video call, a request may be transmitted to the second location to begin streaming a video stream. Further, streams may be upgraded to increase the fidelity of quality of a connection or stream.

At 1118, the operation may include connecting streams between the second location and the third location. For example, streams may be connected in accordance with the description provided for FIG. 7.

At 1120, the operation may include disconnecting streams between the second location and the first location. For example, the functionally grouped device may be disbanded, and the individual devices may be used individually and/or may wait to be configured into a subsequent functionally grouped device. In some embodiments, the network devices 208 may store metadata or configurations associated with various functionally grouped devices to establish a connection with a previously-used functionally grouped device at a later time.

Figure 12:
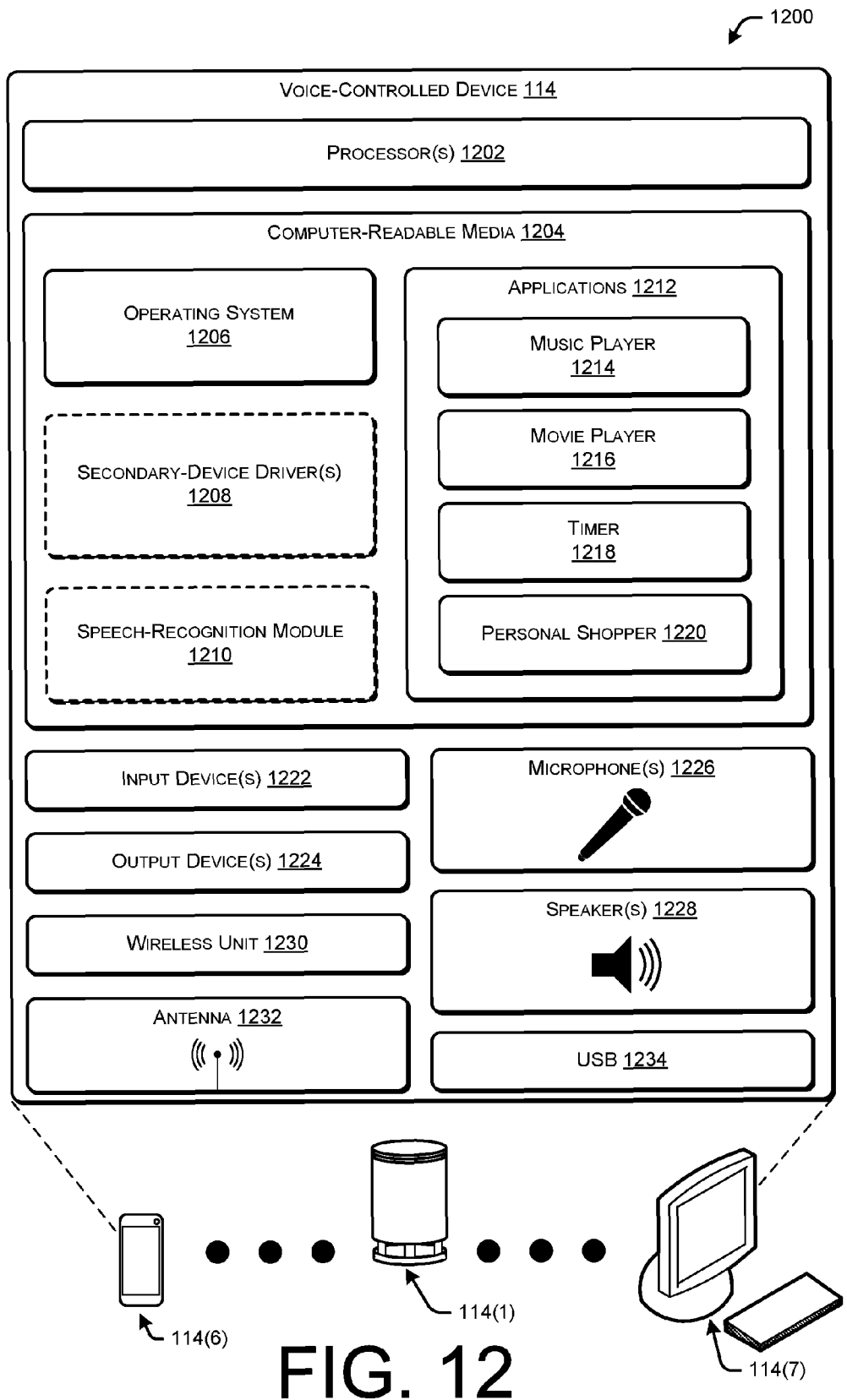
FIG. 12 shows a functional block diagram of selected components implemented as a user device, such as a voice-controlled device of FIG. 1.

FIG. 12 shows a functional block diagram 1200 of selected components implemented as a user device, such as a voice-controlled device 114(1) of FIG. 1.

The voice-controlled device 114(1) may be implemented as a standalone device 114(1) that is relatively simple in terms of functional capabilities with limited input/output components, memory, and processing capabilities. For instance, the voice-controlled device 114(1) does not have a keyboard, keypad, or other form of mechanical input. Nor does it have a display (other than simple lights, for instance) or touch screen to facilitate visual presentation and user touch input. Instead, the device 114(1) may be implemented with the ability to receive and output audio, a network interface (wireless or wire-based), power, and processing/memory capabilities. In certain implementations, a limited set of one or more input components may be employed (e.g., a dedicated button to initiate a configuration, power on/off, etc.). Nonetheless, the primary and potentially only mode of user interaction with the device 114(1) is through voice input and audible output. In some instances, the device 114(1) may simply comprise a microphone, a power source (e.g., a battery), and functionality for sending captured audio signals to another device.

The voice-controlled device 114(1) may also be implemented as a mobile device 114(6) such as a smart phone or personal digital assistant. The mobile device 104(2) may include a touch-sensitive display screen and various buttons for providing input as well as additional functionality such as the ability to send and receive telephone calls. Alternative implementations of the voice-controlled device 104 may also include configuration as a personal computer 114(7). The personal computer 114(7) may include a keyboard, a mouse, a display screen, and any other hardware or functionality that is typically found on a desktop, notebook, netbook, or other personal computing devices. The devices 114(1), 114(6), and 114(7) are merely examples and not intended to be limiting, as the techniques described in this disclosure may be used in essentially any device that has an ability to recognize speech input or other types of natural language input.

In the illustrated implementation, the voice-controlled device 114(1) includes one or more processors 1202 and computer-readable media 1204. In some implementations, the processors(s) 1202 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 1202 may possess its own local memory, which also may store program modules, program data, and/or one or more operating systems.

The computer-readable media 1204 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 1204 may be implemented as computer-readable storage media ("CRSM"), which may be any available physical media accessible by the processor(s) 1202 to execute instructions stored on the memory 1204. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 1202.

Several modules such as instruction, data stores, and so forth may be stored within the computer-readable media 1204 and configured to execute on the processor(s) 1202. A few example functional modules are shown as applications stored in the computer-readable media 1204 and executed on the processor(s) 1202, although the same functionality may alternatively be implemented in hardware, firmware, or as a system on a chip (SOC).

An operating system module 1206 may be configured to manage hardware and services within and coupled to the device 114 for the benefit of other modules. In addition, in some instances the device 114 may include some or all of one or more secondary-device drivers 1208 for interacting with various devices in a user environment. In other instances, meanwhile, the device 114 may be free from the drivers 1208 for interacting with the various devices. The device 114 may further including, in some instances, a speech-recognition module 1210 that employs any number of conventional speech processing techniques such as use of speech recognition, natural-language understanding, and extensive lexicons to interpret voice input. In some instances, the speech-recognition module 1210 may simply be programmed to identify the user uttering a predefined word or phrase (i.e., a "wake word"), after which the device 114 may begin uploading audio signals to the network device 208 for more robust speech-recognition processing. In other examples, the device 114 itself may, for example, identify voice commands from users and may provide indications of these commands to the network device 208. In some instances, the device 114 may continuously listen to audio in an environment to determine a location of a user. In some instances, a continuous audio stream may be analyzed at a computing device location in an environment of the user, while selectively uploading audio to a network device remote from the environment.

The voice-controlled device 114 may also include a plurality of applications 1212 stored in the computer-readable media 1204 or otherwise accessible to the device 104.

In this implementation, the applications 1212 are a music player 1214, a movie player 1216, a timer 1218, and a personal shopper 1220. However, the voice-controlled device 114 may include any number or type of applications and is not limited to the specific examples shown here. The music player 1214 may be configured to play songs or other audio files. The movie player 1216 may be configured to play movies or other audio visual media. The timer 1218 may be configured to provide the functions of a simple timing device and clock. The personal shopper 1220 may be configured to assist a user in purchasing items from web-based merchants.

Generally, the voice-controlled device 114 has input devices 1222 and output devices 1224. The input devices 1222 may include a keyboard, keypad, mouse, touch screen, joystick, control buttons, etc. In some implementations, one or more microphones 1226 may function as input devices 1222 to receive audio input, such as user voice input. The output devices 1224 may include a display, a light element (e.g., LED), a vibrator to create haptic sensations, or the like. In some implementations, one or more speakers 1228 may function as output devices 1224 to output audio sounds.

A user 124 may interact with the voice-controlled device 114 by speaking to it, and the one or more microphone(s) 1226 captures the user's speech. The voice-controlled device 114 can communicate back to the user by emitting audible statements through the speaker 1228. In this manner, the user 124 can interact with the voice-controlled device 114 solely through speech, without use of a keyboard or display.

The voice-controlled device 114 may further include a wireless unit 1230 coupled to an antenna 1232 to facilitate a wireless connection to a network. The wireless unit 1230 may implement one or more of various wireless technologies, such as Wi-Fi, Bluetooth®, RF, and so on. A USB port 1234 may further be provided as part of the device 114 to facilitate a wired connection to a network, or a plug-in network device that communicates with other wireless networks. In addition to the USB port 1234, or as an alternative thereto, other forms of wired connections may be employed, such as a broadband connection.

Accordingly, when implemented as the primarily-voice-operated device 114(1), there may be no input devices, such as navigation buttons, keypads, joysticks, keyboards, touch screens, and the like other than the microphone(s) 1226. Further, there may be no output such as a display for text or graphical output. The speaker(s) 1228 may be the main output device. In one implementation, the voice-controlled device 114(1) may include non-input control mechanisms, such as basic volume control button(s) for increasing/decreasing volume, as well as power and reset buttons. There may also be a simple light element (e.g., LED) to indicate a state such as, for example, when power is on.

Accordingly, the device 114(1) may be implemented as an aesthetically appealing device with smooth and rounded surfaces, with one or more apertures for passage of sound waves. The device 114(1) may merely have a power cord and optionally a wired interface (e.g., broadband, USB, etc.). As a result, the device 114(1) may be generally produced at a low cost. Once plugged in, the device may automatically self-configure, or with slight aid of the user, and be ready to use. In other implementations, other I/O components may be added to this basic model, such as specialty buttons, a keypad, display, and the like.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system, comprising:
one or more processors; and
one or more non-transitory computer-readable media storing computer-executable instructions that, when executed by the one or more processors, cause the one or more processors to:
receive a request to initiate communication between a first user and a second user without identifying a device or location associated with the second user, the first user associated with a first user profile and the second user associated with a second user profile;
determine, using the second user profile, that the second user is associated with a first location;
determine that an RF sensor in the first location has received an RF signal;
determine that the RF signal corresponds to RF data associated with a mobile phone that is associated with the second user profile;
determine that the second user profile indicates a preference for video communications;
determine that a device that includes a camera and a microphone is located in the first location, the device capable of capturing first video data using the camera and capturing first audio data using the microphone;
determine that a television is located in the first location, the television capable of displaying second video data and outputting first sound associated with second audio data;
determine that the device is within a threshold distance of the television in the first location;
form a functionally grouped arrangement including the device and the television by storing an indication that the device and the television are to be used for a video communication between the first user profile and the second user profile;
instruct the device to send the first video data to a first device associated with the first user profile;
instruct the device to send the first audio data to a second device associated with the first user profile;
instruct a third device associated with the first user profile to send the second video data to the television for output by the television; and
instruct a fourth device associated with the first user profile to send the second audio data to the television for output by the television.

2. The system of claim 1, further configured to:
receive image data from the device;
perform facial recognition on the image data;
receive, at the RF sensor in the first location, the RF data associated with the mobile phone, the RF data including a received signal strength indicator (RSSI) associated with a strength of the RF signal received by the RF sensor; and
determine, using at least the facial recognition and the RF data, that the second user is located in the first location.

3. The system of claim 1, wherein the threshold distance is a first threshold distance, the system further configured to:
receive first image data from the device, the first image data corresponding to the first location;
perform image analysis on the first image data to determine that the first image data does not include a representation of a user;
receive second image data from an imaging device in a second location;
perform image analysis on the second image data to determine that the second image data includes a representation of the second user;
determine that a voice-controlled device is located in the second location, the voice-controlled device capable of capturing third audio data and outputting third sound associated with the second audio data;
instruct the voice-controlled device to send the third audio data to the second device associated with the first user profile; and
instruct the fourth device associated with the first user profile to send the second audio data to the voice-controlled device for output by the voice-controlled device.

4. The system of claim 1, further configured to:
determine that executing the video communication includes sending and receiving audio and sending and receiving video; and
determine that the device and the television collectively provide capabilities for the sending and receiving of audio and the sending and receiving of video.

5. The system of claim 1, wherein the television is a first television, the system further configured to:
determine that a second television is in the first location by accessing a database identifying equipment in the first location, the second television capable of displaying the second video data and outputting second sound associated with the second audio data;
determine, based on a stored location of the second television, that the device is within the threshold distance of the second television;
receive image data from the device including a representation of the second user; and
perform facial recognition on the image data to determine that the second user is facing the first television;
and wherein the forming comprises forming the functionally grouped arrangement by storing the indication that the device and the first television are to be used for the video communication based at least in part on determining that the second user is facing the first television.

6. A system, comprising:
one or more processors; and
one or more non-transitory computer-readable media storing computer-executable instructions that, when executed by the one or more processors, cause the one or more processors to:
receive a request to initiate a communication between a first user associated with a first user profile and a second user associated with a second user profile;
determine, based on at least one preference setting associated with at least one of the first user profile or the second user profile, that the communication is to be a first type of communication;
determine that the second user is located in a first zone;
determine that a first device located within the first zone is configured to output audio and capture audio;
determine that a second device located within the first zone is configured to output video and capture video;
select, as a functionally grouped arrangement, the first device and the second device for use in the first type of communication, the functionally grouped arrangement selected at least in part on the at least one preference setting; and
initiate the first type of communication using the functionally grouped arrangement in the first zone.

7. The system of claim 6, further configured to:
receive initial audio data from a voice-controlled device associated with the first user profile; and
perform automated speech recognition on the initial audio data to determine a command associated with the initial audio data, the command indicating at least the second user profile independent of a computing device associated with the second user profile and independent of a current location of the second user.

8. The system of claim 6, further configured to:
determine that the second user has moved from the first zone to a second zone; and
transfer the first type of communication from the functionally grouped arrangement to another functionally grouped arrangement.

9. The system of claim 6, further configured to:
receive a first request to associate the first device with the first zone;
store an indication that the first device is associated with the first zone;
receive a second request to associate a third device with a second zone; and
store an indication that the third device is associated with the second zone.

10. The system of claim 6, further configured to:
receive, at a first radio frequency (RF) sensor located in the first zone, first RF data from a mobile device associated with the second user profile, the first RF data indicating at least a first signal strength of a first RF signal sent from the mobile device;
receive, at a second RF sensor located in a second zone, second RF data, the second RF data indicating a second signal strength of a second RF signal sent from the mobile device;
analyze the first RF data and the second RF data;
determine a confidence level that the mobile device is located in the first zone; and
determine, based at least in part on the confidence level, that the second user is located in the first zone.

11. The system of claim 6, further configured to:
determine that device capabilities associated with the first type of communication are not provided individually by the first device or the second device.

12. The system of claim 6, wherein the first type of communication requires at least:
a first capability to capture audio;
a second capability to output audio;
a third capability to capture video; and
a fourth capability to output video.

13. The system of claim 6, further configured to:
receive image data from the second device located in the first zone;
perform image analysis on the image data;
determine that the image data includes a representation of the second user; and
determine that the second user is located in the first zone.

14. The system of claim 6, further configured to:
receive radio frequency (RF) data corresponding to an RF signal sent by a mobile device associated with the second user profile; and
determine, based at least in part on a signal strength of the RF signal indicated by the RF data, that the second user is in the first zone.

15. A method, comprising:
receiving a request to initiate a communication between a first user associated with a first user profile and a second user associated with a second user profile;
determining, based on at least one preference setting associated with at least one of the first user profile or the second user profile, that the communication is to be a first type of communication;
determining that the second user is located in a first zone;
determining that a first device located within the first zone is configured to output audio and capture audio;
determining that a second device located within the first zone is configured to output video and capture video;
selecting, as a functionally grouped arrangement, the first device and the second device for use in the first type of communication, the selecting based at least in part on the at least one preference setting; and
initiating the first type of communication using the functionally grouped arrangement in the first zone.

16. The method of claim 15, the method further comprising:
receiving initial audio data from a voice-controlled device associated with the first user profile; and
performing automated speech recognition on the initial audio data to determine a command associated with the initial audio data, the command indicating at least the second user profile independent of a computing device associated with the second user profile and independent of a current location of the second user.

17. The method of claim 15, further comprising:
determining that the second user has moved from the first zone to a second zone; and
transferring the first type of communication from the functionally grouped arrangement to another functionally grouped arrangement.

18. The method of claim 15, further comprising:
receiving, at a first radio frequency (RF) sensor located in the first zone, first RF data from a mobile device associated with the second user profile, the first RF data indicating at least a first signal strength of a first RF signal sent from the mobile device;
receiving, at a second RF sensor located in a second zone, second RF data, the second RF data indicating a second signal strength of a second RF signal sent from the mobile device;
analyzing the first RF data and the second RF data;
determining a confidence level that the mobile device is located in the first zone; and
determining, based at least in part on the confidence level, that the second user is located in the first zone.

19. The method of claim 15, further comprising:
determining that device capabilities associated with the first type of communication are not provided individually by the first device or the second device.

20. The method of claim 15, further comprising:
receiving radio frequency (RF) data corresponding to an RF signal sent by a mobile device associated with the second user profile; and
determining, based at least in part on a signal strength of the RF signal indicated by the RF data, that the second user is in the first zone.

* * * * *